(12) United States Patent
Tomoda

(10) Patent No.: US 11,735,221 B2
(45) Date of Patent: Aug. 22, 2023

(54) MAGNETIC DISK DEVICE AND METHOD OF CHANGING RECORDING MODE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yusuke Tomoda, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/674,425

(22) Filed: Feb. 17, 2022

(65) Prior Publication Data

US 2023/0109214 A1 Apr. 6, 2023

(30) Foreign Application Priority Data

Sep. 17, 2021 (JP) .................................. 2021-152013

(51) Int. Cl.
| | |
|---|---|
| *G11B 5/00* | (2006.01) |
| *G11B 15/12* | (2006.01) |
| *G11B 5/02* | (2006.01) |
| *G11B 5/54* | (2006.01) |
| *G11B 5/31* | (2006.01) |
| *G11B 5/012* | (2006.01) |

(52) U.S. Cl.
CPC ............... *G11B 15/125* (2013.01); *G11B 5/02* (2013.01); *G11B 5/012* (2013.01)

(58) Field of Classification Search
CPC ........... G11B 20/10388; G11B 20/1803; G11B 20/12; G11B 2005/0021; G11B 2020/1238; G11B 2020/1292; G11B 11/10543; G11B 11/10; G11B 11/105; G11B 7/1263; G11B 7/1267; G11B 7/126; G11B 5/604
USPC ......................................................... 360/59
See application file for complete search history.

(56) References Cited

U.S. PATENT DOCUMENTS

| | | | |
|---|---|---|---|
| 8,085,487 B1* | 12/2011 | Jung et al. ......... | G11B 5/59633 360/48 |
| 9,218,849 B1 | 12/2015 | Trantham et al. | |
| 9,305,584 B2 | 4/2016 | Koizumi et al. | |
| 9,330,688 B1* | 5/2016 | Zhu et al. ........ | G11B 20/10009 |
| 9,805,752 B2* | 10/2017 | Yoon et al. .......... | G11B 5/6041 |
| 10,825,478 B1* | 11/2020 | Matsumoto ......... | G11B 5/5534 |
| 10,872,622 B1 | 12/2020 | Li | |
| 11,120,822 B2* | 9/2021 | Ohtake et al. ......... | G11B 5/012 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a disk, a head including a read head that reads data from the disk, a write head that writes data to the disk, and an assist element that generates energy to enhance write performance by the write head, and a controller that selects and performs a first recording mode and a second recording mode different from the first recording mode, and selects and performs one of the first recording mode and the second recording mode according to an assist effect of the assist element.

16 Claims, 12 Drawing Sheets

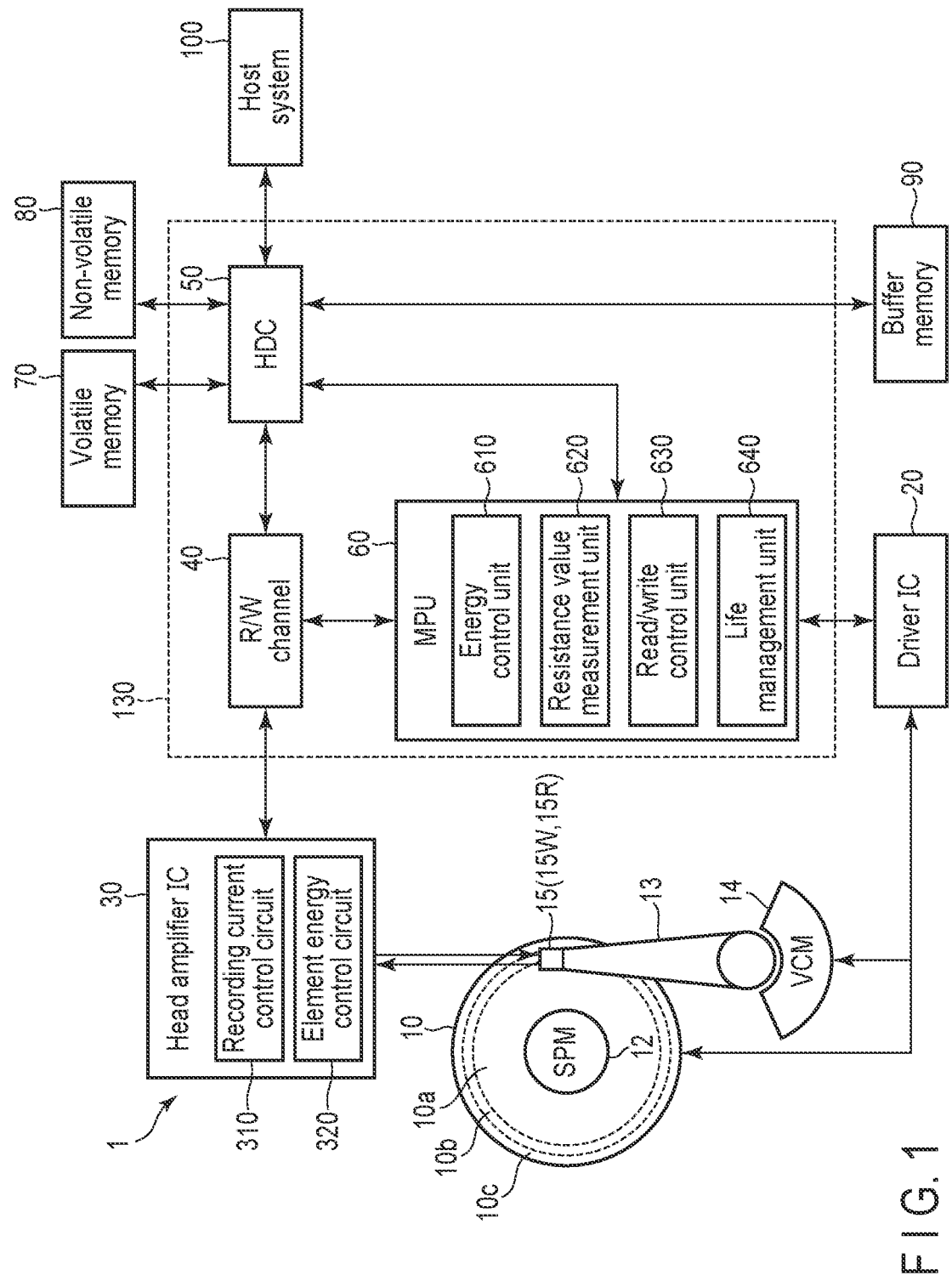
F I G. 1

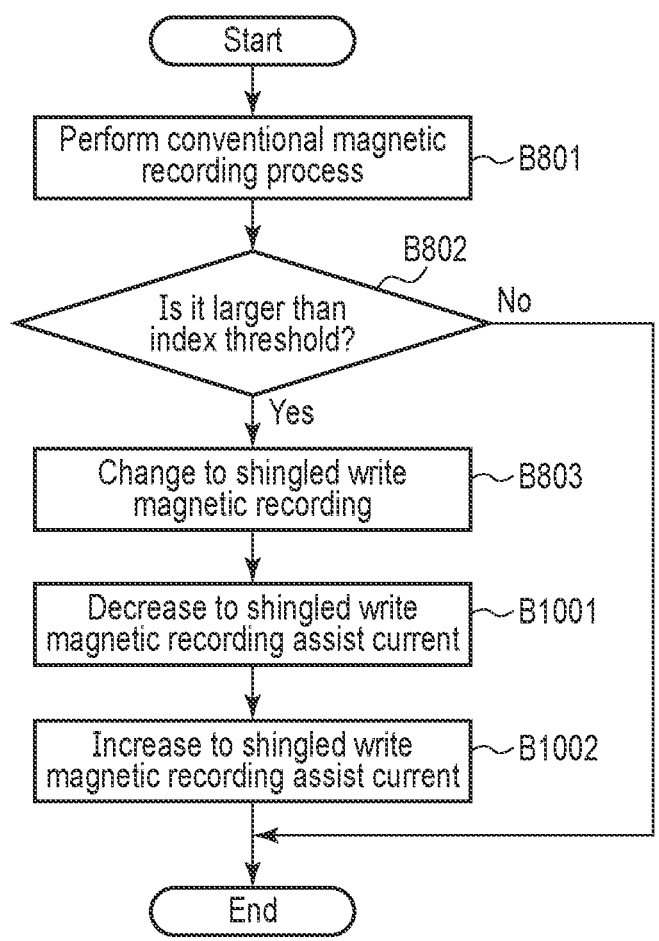
F I G. 10

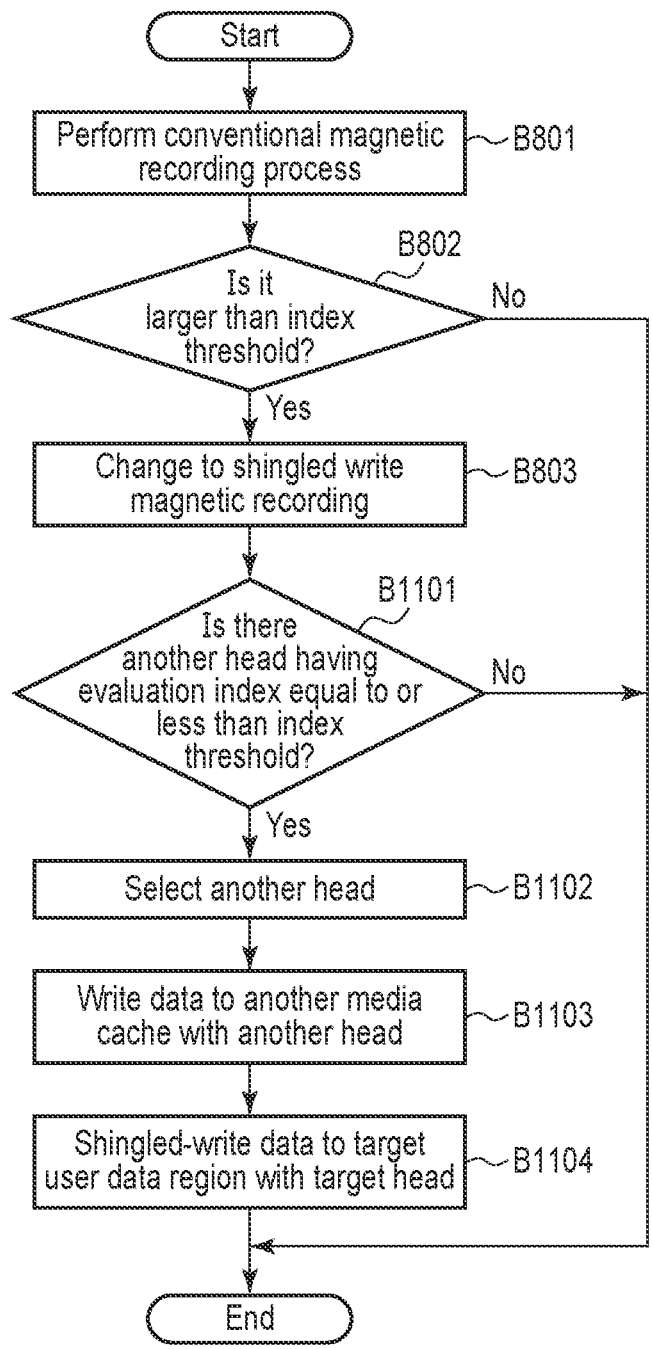
F I G. 11

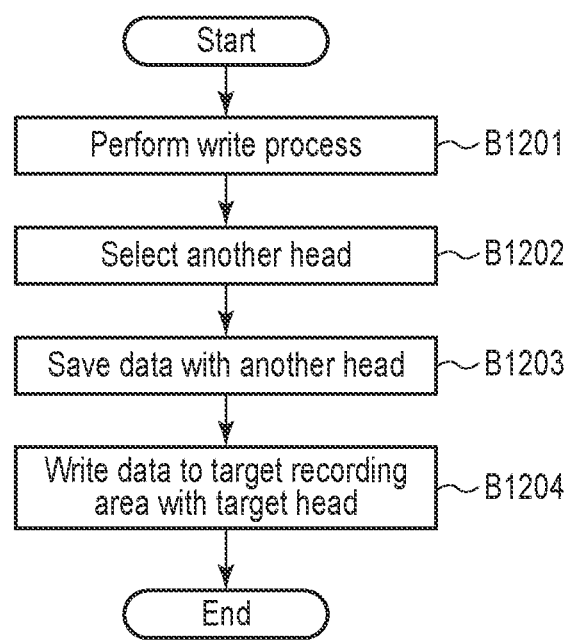
F I G. 12

MAGNETIC DISK DEVICE AND METHOD OF CHANGING RECORDING MODE

CROSS-REFERENCE TO RELATED APPLICATIONS

This application is based upon and claims the benefit of priority from Japanese Patent Application No. 2021-152013, filed Sep. 17, 2021, the entire contents of which are incorporated herein by reference.

FIELD

Embodiments described herein relate generally to a magnetic disk device and a method of changing a recording mode.

BACKGROUND

In order to implement high recording density and high recording capacity of a magnetic disk device, a radio frequency (Microwave) Assisted Magnetic Recording (MAMR), Thermally Assisted Magnetic Recording (TAMR), and any other recording are developed. The radio frequency assisted recording is a technology in which with the use of a magnetic head including a radio frequency oscillator and a recording magnetic pole (main magnetic pole), which is excited with the application of a recording current and generates a recording magnetic field, a radio frequency magnetic field generated by carrying a current to the radio frequency oscillator is applied to a disk for a reduced coercive force of the part of the disk to which the radio frequency magnetic field is applied. The thermally assisted magnetic recording is a technology in which with the use of a magnetic head having a light application element that applies application light to a disk, the application light is applied from the tip of the light application element to the disk, and the disk is locally heated, for a reduced coercive force of the part of the heated disk.

There is a magnetic disk device for Conventional Magnetic Recording (CMR) or a conventional recording mode, which writes a plurality of tracks at intervals in the radial direction of a disk, and a magnetic disk device for Shingled write Magnetic Recording (SMR, or Shingled Write Recording: SWR), which overwrites a plurality of tracks in the radial direction of a disk. Nowadays, there is developed a magnetic disk device capable of selecting and performing conventional magnetic recording and shingled write magnetic recording.

BRIEF DESCRIPTION OF THE DRAWINGS

FIG. 1 is a block diagram illustrating the configuration of a magnetic disk device according to a first embodiment.

FIG. 10 is a flowchart illustrating an example of a method of generating write data according to an embodiment.

FIG. 11 is a flowchart illustrating an example of a method of changing a recording mode of a particular head according to the life of the assist element according to a third modification.

FIG. 12 is a schematic diagram illustrating an example of a write process method according to a second embodiment.

DETAILED DESCRIPTION

Figure 2:
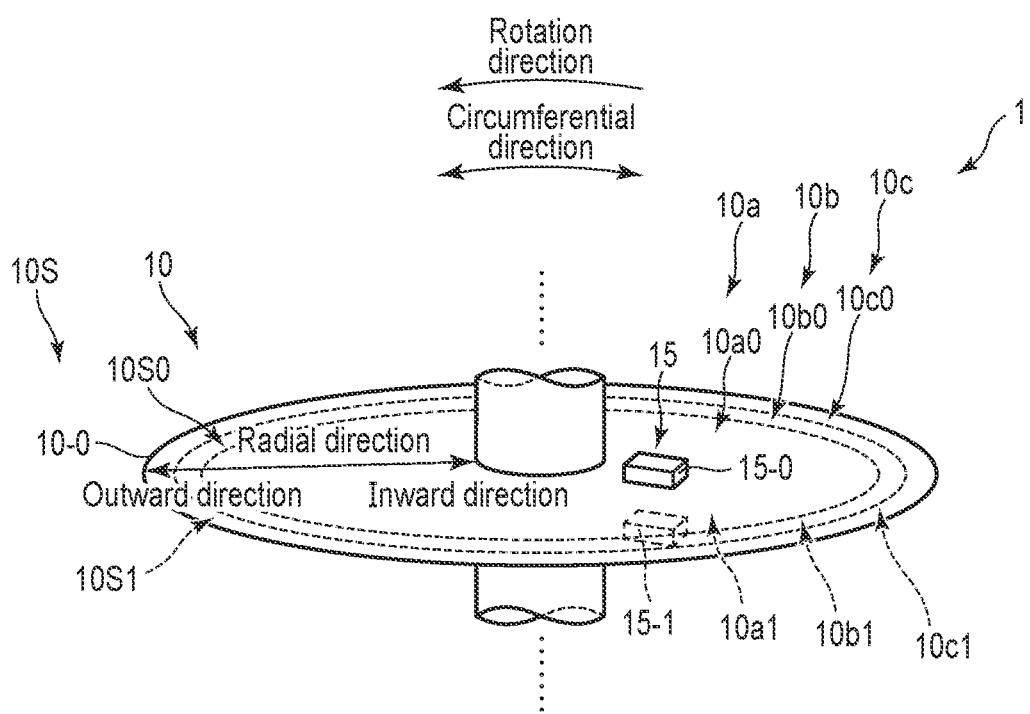
FIG. 2 is a schematic diagram illustrating an example of an arrangement of a head to a disk according to the first embodiment.

In general, according to one embodiment, a magnetic disk device comprising: a disk; a head including a read head that reads data from the disk, a write head that writes data to the disk, and an assist element that generates energy to enhance write performance by the write head; and a controller that selects and performs a first recording mode and a second recording mode different from the first recording mode, and selects and performs one of the first recording mode and the second recording mode according to an assist effect of the assist element.

In the following, an embodiment will be described with reference to the drawings. Note that the drawings are merely examples, and do not limit the scope of the invention.

First Embodiment

FIG. 1 is a block diagram illustrating the configuration of a magnetic disk device 1 according to a first embodiment.

The magnetic disk device 1 includes a head disk assembly (HDA) described later, a driver integrated circuit (IC) 20, a head amplifier integrated circuit (in the following, a head amplifier IC or a preamplifier) 30, a volatile memory 70, a nonvolatile memory 80, a buffer memory (buffer) 90, and a system controller 130 that is a one-chip integrated circuit. The magnetic disk device 1 is connected to a host system (in the following, simply referred to as a host) 100.

The HDA has a magnetic disk (in the following, referred to as a disk) 10, a spindle motor (SPM) 12, an arm 13 on which a head 15 is mounted, and a voice coil motor (VCM) 14. The disk 10 is attached to the SPM 12 and rotates by drive of the SPM 12. The arm 13 and the VCM 14 constitute an actuator. The actuator controls the movement of the head 15 mounted on the arm 13 to a particular position of the disk 10 by drive of the VCM 14. A plurality of disks 10 and a plurality of heads 15 are provided. Note that one disk 10 and one head 15 alone may be provided.

The disk 10 is allocated with a user data region 10a that is usable by a user, a media cache (or a media cache region) 10b that temporarily holds data (or a command) transferred from the host 100 and any other component before the data is written to a particular region of the user data region 10a, and a system region 10c in which information necessary for system management is written in a region in which the data is writable. In the following, a direction from the inner circumference to the outer circumference of the disk 10 or a direction from the outer circumference to the inner circumference of the disk 10 is referred to as a radial direction. In the radial direction, a direction from the inner circumference to the outer circumference is referred to as an outward direction (outer side), and a direction from the inner circumference to the outer circumference is referred to as an inward direction (inner side). A direction orthogonal to the radial direction of the disk 10 is referred to as a circumferential direction. The circumferential direction corresponds to a direction along the circumference of the disk 10. The radial direction and the circumferential direction are orthogonal to each other. A particular position in the radial direction of the disk 10 is sometimes referred to as a radial position, and a particular position in the circumferential direction of the disk 10 is sometimes referred to as a circumferential position. The radial position and the circumferential position are sometimes collectively simply referred to as a position. The disk 10 can be divided into a plurality of areas. For example, the disk 10 can be divided into regions (in the following, the region is sometimes referred to as a zone) including a particular number of tracks in the radial direction. The zones may be divided for each track in the radial direction.

Note that the term "track" is used as various meanings including one recording region in a plurality of recording regions obtained by dividing the disk 10 in the radial direction, a recording region of one circle at a particular radial position of the disk 10, a particular recording region at a particular radial position of the disk 10, a recording region extending in the circumferential direction of the disk 10, a recording region corresponding to a path of the head 15 positioned at a particular radial position of the disk 10, a path of the head 15 positioned at a particular radial position of the disk 10, data written in one recording region in a plurality of recording regions obtained by dividing the disk 10 in the radial direction, data written in a recording region of one circle at a particular radial position of the disk 10, data written in a particular recording region at a particular radial position of the disk 10, data written in a recording region extending in the circumferential direction of the disk 10, data written in a recording region corresponding to a path of the head 15 positioned at a particular radial position of the disk 10, data written along a path of the head 15 positioned at a particular radial position of the disk 10, data extending in the circumferential direction in the disk 10, data written in a particular track of the disk 10, data of one circle written in a particular track of the disk 10, a part of data written in a particular track of the disk 10, and other meanings. The term "sector" is used as various meanings including one recording region in a plurality of recording regions obtained by dividing a particular track of the disk 10 in the circumferential direction, one recording region in a plurality of recording regions obtained by dividing a recording region extending in the circumferential direction at a particular radial position of the disk 10, a particular recording region of a particular track of the disk 10, a particular circumferential position of a particular track of the disk 10, a particular circumferential position (particular position) at a particular radial position of the disk 10, data written in one recording region in a plurality of recording regions obtained by dividing a particular track of the disk 10 in the circumferential direction, data written in one recording region of a plurality of recording regions obtained by dividing a recording region extending in the circumferential direction at a particular radial position of the disk 10, data written in a particular recording region of a particular track of the disk 10, data written at a particular circumferential position of a particular track of the disk 10, data written at a particular circumferential position (particular position) at a particular radial position of the disk 10, data written in a particular sector, and other meanings. The term "radial width of a track" is sometimes referred to as a "track width". The term "path passing the center position of the track width in a particular track" is sometimes referred to as a "track center". The data, which is usable by the user, written in the user data region 10a is sometimes referred to as user data.

The head 15 faces the disk 10. For example, one head 15 faces one surface of the disk 10. The head 15 includes a write head 15W and a read head 15R mounted on a slider, which is a main body. The write head 15W writes data to the disk 10. The read head 15R reads data recorded on the disk 10. Note that the "write head 15W" is sometimes simply referred to as the "head 15", the "read head 15R" is sometimes simply referred to as the "head 15", or the "write head 15W and the read head 15R" are sometimes collectively referred to as the "head 15". The "center part of the head 15" is sometimes referred to as the "head 15", the "center part of the write head 15W" is sometimes referred to as the "write head 15W", and the "center part of the read head 15R" is sometimes referred to as the "read head 15R". The "center part of the write head 15 W" is sometimes simply referred to as the "head 15", and the "center part of the read head 15R" is sometimes simply referred to as the "head 15". The term "to position the center part of head 15 at the track center of a particular track" is sometimes expressed as "to position the head 15 on a particular track", "to place the head 15 on a particular track", "to position the head 15 on a particular track", or any other expression.

FIG. 2 is a schematic diagram illustrating an example of the arrangement of the head 15 to the disk 10 according to the present embodiment. As illustrated in FIG. 2, in the circumferential direction, a direction in which the disk 10 rotates is referred to as a rotation direction. Note that in the example illustrated in FIG. 2, although the rotation direction is indicated in the counterclockwise direction, the rotation direction may be the opposite direction (clockwise direction).

In the example illustrated in FIG. 2, the disk 10 includes a disk 10-0 and so on. The disk 10 has a surface 10S (10S0, 10S1,...). The disk 10-0 has a front surface 10S0 and a back front surface 10S1 opposite to the front surface 10S0. The front surface 10S0 has a user data region 10a0, a media cache 0b0, and a system area 10c0. The back surface 10S1 includes a user data region 10a1, a media cache 10b1, and a system area 10c1.

The head 15 includes a plurality of heads 15. In the example illustrated in FIG. 2, the head 15 includes a head 15-0, a heads 15-1, and so on. The head 15 faces the surface 10S. The plurality of heads 15 each faces a plurality of the surfaces 10S of the disk. In the example illustrated in FIG. 2, the head 15-0 faces the front surface 10S0. The head 15-0 writes data to the front surface 10S0 and reads data from the front surface 10S0. The head 15-1 faces the back surface 10S1. The head 15-1 writes data to the back surface 10S1 and reads data from the back surface 10S1. Note that three or more heads 15 and three or more disks 10 may be provided.

Figure 3:
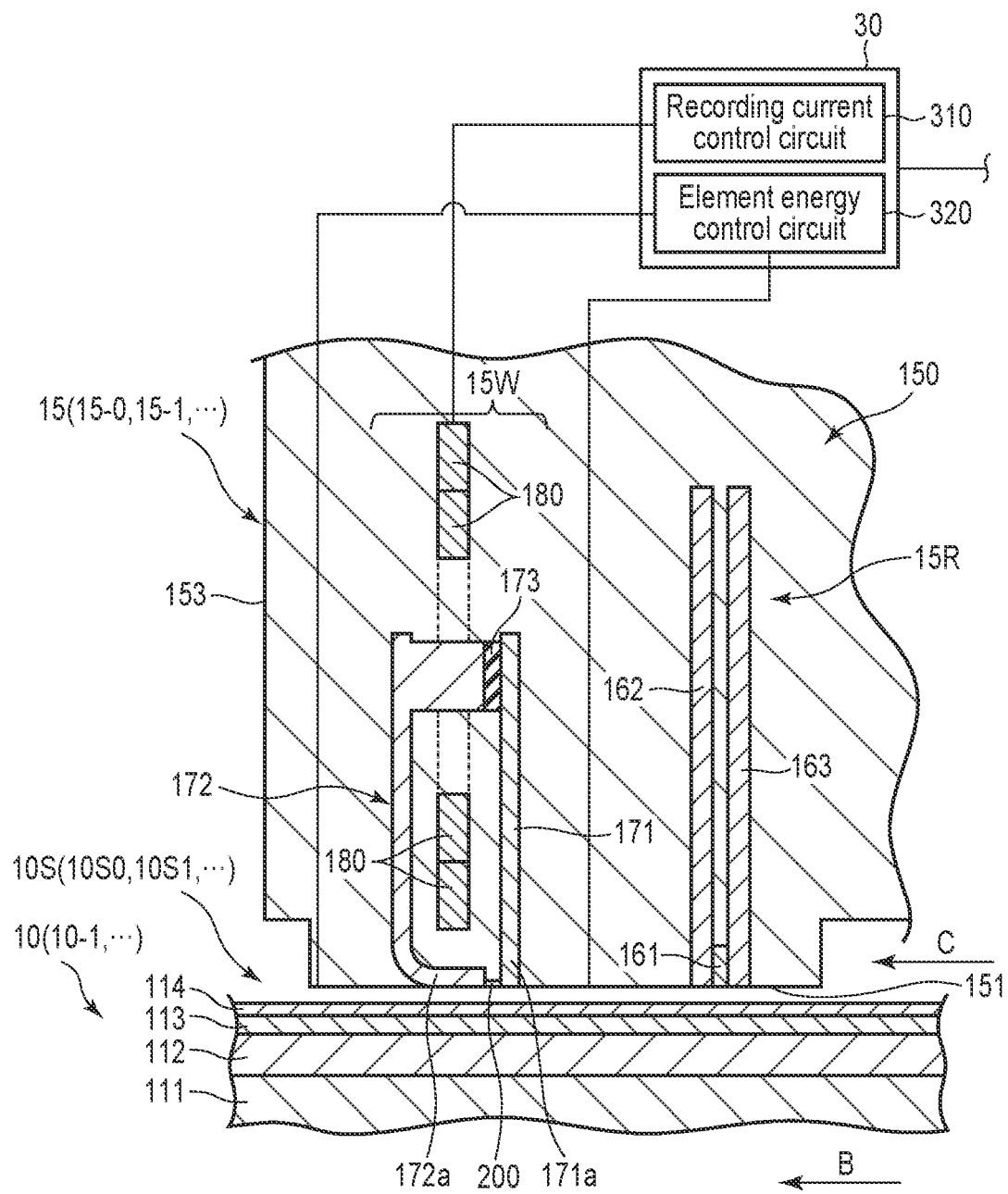
FIG. 3 is an enlarged cross-sectional view illustrating an example of the disk and the head according to the first embodiment.

FIG. 3 is an enlarged cross-sectional view illustrating an example of the disk 10 and the head 15 according to the present embodiment. In FIG. 3, a rotation direction B of the disk 10 (10-0,...) matches the direction of an air flow C. In the following, a direction from the head 15 (15-0, 15-1,...) toward the disk 10 is referred to as a downward direction or simply as downward, and a direction from the disk 10 toward the head 15 is referred to as an upward direction or simply as upward. In the case in which expressions such as "another layer above a particular layer" and "another layer below a particular layer" are used, the other layer may be in contact with a particular layer or may be located apart from a particular layer.

In the example illustrated in FIG. 3, in the disk 10, a substrate 111, a soft magnetic layer 112, a magnetic recording layer 113, and a protective film layer 114 are sequentially layered. The substrate 111 is formed of a disk-shaped non-magnetic body. The soft magnetic layer 112 is located on the substrate 111. The soft magnetic layer 112 is formed of a material exhibiting soft magnetic properties. The magnetic recording layer 113 is located on the soft magnetic layer 112. The magnetic recording layer 113 has magnetic anisotropy in a direction perpendicular to the front surface of the disk 10 (the front surface of the magnetic recording layer 113 or the front surface of the protective film layer 114). The protective film layer 114 is located on the magnetic recording layer 113.

In the example illustrated in FIG. 3, the head 15 includes a slider 150. For example, the slider 150 is formed of a sintered body (altic) of alumina and titanium carbide. The slider 150 has a disk facing front surface (air bearing front surface (ABS)) 151 facing the front surface of the disk 10, for example, the protective film layer 114, and a trailing end 153 located on the outflow side of the air flow C. A part of the read head 15R and a part of the write head 15W are exposed from the disk facing surface 151.

The read head 15R includes a magnetic film 161, a shield film 162, and a shield film 163. The magnetic film 161 is located between the shield film 162 and the shield film 163 and produces a magnetoresistance effect. The shield film 162 is located on the trailing end 153 side to the magnetic film 161. The shield film 163 faces the shield film 162. The lower ends of the magnetic film 161, the shield film 162, and the shield film 163 are exposed from the disk facing surface 151.

The write head 15W is provided on the trailing end 153 side of the slider 150 to the read head 15R. The write head 15W includes a main magnetic pole 171, a trailing shield (write shield) 172, an insulator 173, a recording coil 180 disposed so as to be wound around a magnetic circuit including the main magnetic pole 171 and the write shield 172 in order to carry a magnetic flux through the main magnetic pole 171, and an assist element, e.g., a magnetic flux control unit (Spin Torque Oscillator (STO)) 200.

The main magnetic pole 171 is made of a soft magnetic material having a high saturation magnetic flux density. The main magnetic pole 171 generates a recording magnetic field in a direction perpendicular to the front surface of the disk 10 in order to magnetize the magnetic recording layer 113 of the disk 10. In the illustrated example, the main magnetic pole 171 extends substantially perpendicular to the disk facing surface 151. The lower surface of the tip end 171a of the main magnetic pole 171 on the disk facing surface 151 side is exposed from the disk facing surface 151. The tip end 171a of the main magnetic pole 171 is tapered toward the disk facing surface 151, and is formed in a columnar shape having a narrower width than that of other parts. The width of the tip end 171a of the main magnetic pole 171 in the cross track direction substantially corresponds to the track width of a particular track. The cross-track direction is, for example, a direction along the radial direction.

The write shield 172 is made of a soft magnetic material having a high saturation magnetic flux density. The write shield 172 is provided to efficiently close the magnetic path through the soft magnetic layer 112 immediately below the main magnetic pole 171. The write shield 172 is located on the trailing end 153 side to the main magnetic pole 171. The write shield 172 is connected to the main magnetic pole 171 through the insulator 173. The main magnetic pole 171 is electrically insulated from the write shield 172 to form a magnetic circuit. The write shield 172 is formed in a substantially L shape, and has a tip end 172a facing the tip end 171a of the main magnetic pole 171 with a write gap on the disk facing surface 151 side. The lower surface of the tip end 172a is exposed from the disk facing surface 151 of the slider 150.

The recording coil 180 is provided so as to be wound around the magnetic circuit including the main magnetic pole 171 and the write shield 172 in order to carry a magnetic flux through the main magnetic pole 171. The recording coil 180 is provided, for example, between the main magnetic pole 171 and the write shield 172. With a supply of a current of a particular magnitude (referred to as a write current or a recording current) to the recording coil 180, a recording magnetic field is excited in the main magnetic pole 171 and the write shield 172. Therefore, the main magnetic pole 171 and the write shield 172 are magnetized. The magnetization direction of the recording bit of the magnetic recording layer 113 of the disk 10 is changed by the magnetic flux carried through the magnetized main magnetic pole 171 and the write shield 172, and thus a magnetization pattern corresponding to the recording current is recorded on the disk 10.

The assist element, e.g., the spin torque oscillator (STO) 200 is provided between the tip end 171a of the main magnetic pole 171 and the tip end 172a of the write shield 172. In other words, the assist element (STO) 200 is provided in the write gap. The assist element (STO) 200 has, for example, a structure in which an underlayer including a nonmagnetic conductive layer, a spin injection layer, an intermediate layer, an oscillation layer, and a gap layer including a nonmagnetic conductive layer are layered in order from the tip end 171a side of the main magnetic pole 171 to the tip end 172a side of the write shield 172.

The assist element (STO) 200 generates energy for enhancing the write performance of the write head 15W to the disk 10 to the surface 10S (10S0, 10S1,...) of the disk 10. With the application of particular energy (in the following, sometimes referred to as element energy), for example, a particular current (in the following, referred to as a bias current, a drive current, or an assist current) or a particular voltage (in the following, referred to as a bias voltage, a drive voltage, or an assist voltage) to the assist element (STO) 200, the magnetization uniformly rotates (precession of spin) due to the gap magnetic field generated in the write gap, and a radio-frequency magnetic field (microwave) having a sufficiently higher frequency than the frequency of the recording signal is generated toward the disk 10. The assist element (STO) 200 reduces the coercive force of the magnetic recording layer 113 by applying a radio-frequency magnetic field to the magnetic recording layer 113 of the disk 10. In the case in which the precession of spin is greatly generated in the assist element (STO) 200, the magnetic permeability of the assist element (STO) 200 is in a state in which its magnetic permeability is as low as the magnetic permeability of air. Therefore, the magnetic flux from the main magnetic pole 171 easily flows toward the disk 10 rather than toward the write gap (assist element 200). On the other hand, in the case in which the precession of spin does not occur in the assist element (STO) 200 or occurs smaller than usual, the magnetic permeability of the assist element (STO) 200 is higher than the magnetic permeability of air. Therefore, the magnetic flux from the main magnetic pole 171 easily flows toward the write gap (assist element 200) rather than toward the disk 10. In the following, the write process of writing data by supplying element energy, e.g., a drive current (or sometimes referred to as an assist current) or a drive voltage (or sometimes referred to as an assist voltage) to the assist element, e.g., the STO 200 is sometimes referred to as assisted recording or radio-frequency assisted recording. In the following, the effect of assisting the write process to the disk 10 is sometimes referred to as an assist effect. In addition, the term "to perform assisted recording" is sometimes simply referred to as "write".

The driver IC 20 is connected to the system controller 130 (an MPU 60, which will be described in detail later), the SPM 12, and the VCM 14, and controls the drive of the SPM 12 and the VCM 14 according to the control of the system controller 130 (specifically, the MPU 60, which will be described later).

The head amplifier IC (preamplifier) 30 includes a read amplifier and a write driver, which are not illustrated. The read amplifier amplifies a read signal read from the disk 10 and outputs the amplified read signal to the system controller 130 (a read/write (R/W) channel 40, described in detail later). For example, the write driver includes a recording current control circuit 310, an element energy control circuit 320, and any other component. The recording current control circuit 310 is electrically connected to the recording coil 180, and supplies a recording current corresponding to write data, which is output from the R/W channel 40, to the recording coil 180. In the following, data written to the disk 10 is sometimes referred to as write data, and data read from the disk 10 is sometimes referred to as read data. For example, the recording current control circuit 310 supplies a recording current to the recording coil 180 according to the control of the system controller 130 (MPU 60). The element energy control circuit 320 is electrically connected to the assist element, e.g., the spin torque oscillator 200, and applies particular element energy, e.g., a particular assist current or a particular assist voltage, to the spin torque oscillator 200 according to the control of the system controller 130, e.g., the MPU 60. The element energy control circuit 320 measures the resistance value (in the following, sometimes referred to as the assist element resistance value) of the assist element, e.g., the spin torque oscillator 200.

The volatile memory 70 is a semiconductor memory in which stored data is lost when power supply is cut off. The volatile memory 70 stores data and any other information necessary for processing in the components of the magnetic disk device 1. The volatile memory 70 is a Dynamic Random Access Memory (DRAM) or a Synchronous Dynamic Random Access Memory (SDRAM), for example.

The nonvolatile memory 80 is a semiconductor memory that records stored data even though power supply is cut off. The nonvolatile memory 80 is a NOR or NAND Flash Read Only Memory (FROM), for example.

The buffer memory 90 is a semiconductor memory that temporarily records data and any other information transmitted and received between the magnetic disk device 1 and the host 100. Note that the buffer memory 90 may be configured integrally with the volatile memory 70. The buffer memory 90 is a DRAM, a Static Random Access Memory (SRAM), an SDRAM, a Ferroelectric Random Access Memory (FeRAM), a Magnetoresistive Random Access Memory (MRAM), or any other memory, for example.

The system controller (controller) 130 is implemented using a Large-Scale Integrated circuit (LSI) referred to as a System-on-a-Chip (SoC) in which a plurality of devices is integrated on a single chip, for example. The system controller 130 includes the read/write (R/W) channel 40, a hard disk controller (HDC) 50, and the microprocessor (MPU) 60. The R/W channel 40, the HDC 50, and the MPU 60 are electrically connected to each other. For example, the system controller 130 is electrically connected to the driver IC 20, the head amplifier IC 30, the volatile memory 70, the nonvolatile memory 80, the buffer memory 90, the host system 100, and any other component.

The R/W channel 40 performs signal processing of data transferred from the disk 10 to the host 100, e.g., read data and data transferred from the host 100, for example, write data, in response to an instruction from the MPU 60, described later. For example, the R/W channel 40 is electrically connected to the head amplifier IC 30, the HDC 50, the MPU 60, and any other component. The R/W channel 40 has a circuit or a function that modulates write data. The R/W channel 40 has a circuit or a function that measures the signal quality of read data.

The HDC 50 controls data transfer between the host 100 and the R/W channel 40 in response to an instruction from the MPU 60. For example, the HDC 50 is electrically connected to the R/W channel 40, the MPU 60, the volatile memory 70, the nonvolatile memory 80, the buffer memory 90, and any other component.

The MPU 60 is a main controller that controls the components of the magnetic disk device 1. The MPU 60 controls the VCM 14 through the driver IC 20 to position the head 15. The MPU 60 controls the write operation of data to the disk 10 and selects a storage destination of data transferred from the host 100, for example, write data. The MPU 60 controls the read operation of data from the disk 10, and controls the processing of data transferred from the disk 10 to the host 100, e.g., read data. The MPU 60 manages a region in which data is recorded. The MPU 60 is connected to the components of the magnetic disk device 1. For example, the MPU 60 is electrically connected to the driver IC 20, the R/W channel 40, the HDC 50, and any other component.

The MPU 60 includes an energy control unit 610, a resistance value measurement unit 620, a read/write control unit 630, a life management unit 640, and any other component. The MPU 60 performs the processing of components, e.g., the energy control unit 610, the resistance value measurement unit 620, the read/write control unit 630, the life management unit 640, and any other component on firmware. Note that the MPU 60 may include components, e.g., an energy control unit 610, a resistance value measurement unit 620, a read/write control unit 630, a life management unit 640, and any other component as a circuit.

The energy control unit 610 controls (or adjusts) energy to be supplied to the head 15. The energy control unit 610 controls (or adjusts) a recording current to be supplied (or applied) to the recording coil 180 and element energy to be supplied (or applied) to the assist element.

The energy control unit 610 controls (or adjusts) energy, e.g., a recording current or a recording voltage to be supplied (or applied) to the recording coil 180 through the recording current control circuit 310. The energy control unit 610 controls (or adjusts) energy, e.g., a recording current or a recording voltage to be supplied (or applied) to the plurality of heads 15 through the recording current control circuit 310, e.g., the plurality of recording coils 180 individually mounted on the head 15-0, the head 15-1, and so on.

The energy control unit 610 controls (or adjusts) element energy, e.g., an assist current or an assist voltage to be supplied (or applied) to the assist element, e.g., the STO 200, through the element energy control circuit 320. The energy control unit 610 controls (or adjusts) element energy, e.g., an assist current or an assist voltage to be supplied (or applied) to the plurality of assist elements, e.g., the STO 200 mounted on the plurality of heads 15, e.g., the head 15-0, the head 15-1,..., through the element energy control circuit 320.

The resistance value measurement unit 620 measures the resistance value of the components of the head 15. The resistance value measurement unit 620 measures the resistance value of the assist element, e.g., the STO 200. The resistance value measurement unit 620 measures the resistance value of the assist element, e.g., the STO 200, through the element energy control circuit 320 of the head amplifier IC 30. The assist element resistance value increases, for example, as the assist element 200 deteriorates. In other words, the assist element resistance value increases as the life of the assist element 200 decreases, for example. That is, the assist element resistance value increases, for example, as the assist effect of the assist element 200 deteriorates. The resistance value measurement unit 620 measures a plurality of assist element resistance values respectively corresponding to a plurality of assist elements, for example, the STOs 200, individually mounted on the plurality of heads 15, e.g., the head 15-0, the head 15-1, and so on through the element energy control circuit 320.

The read/write control unit 630 controls a data write process and a read process in response to a command or the like from the host 100 or any other component. In the case of receiving a command from the host 100 or any other component, the read/write control unit 630 performs the write process of writing data to a particular region. In the case of receiving a command from the host 100 or any other component, the read/write control unit 630 performs the read process of reading data from a particular region. The read/write control unit 630 controls the VCM 14 through the driver IC 20, positions the head 15 at a particular position on the disk 10, and performs the read process or the write process. In the following, the term "access" may be used in a meaning including "recording or writing data in a particular region (or the write process)", "reading or reading data from a particular region (or the read process)", and "moving the head 15 or any other component to a particular region".

For example, the read/write control unit 630 performs the write process by Conventional Magnetic Recording (CMR) in which at a particular interval (gap) in the radial direction from a particular track or a particular sector, data is written to another track (in the following, sometimes referred to as an adjacent track) adjacent to the particular track or to another track or another sector (in the following, sometimes referred to as an adjacent sector) adjacent to the particular sector or data is randomly written. Here, the term "adjacent" includes the arrangement of data, an object, a region, a space, and any other component in contact with each other, as well as the arrangement of data, an object, a region, a space, and any other component at particular intervals. The term "adjacent track" includes "a track adjacent to a particular track in the outward direction", "an adjacent track in the inward direction of a particular track", and "a plurality of tracks adjacent in the outward direction and the inward direction of a particular track". The term "adjacent sector" includes "a sector adjacent to a particular sector in the outward direction", "an adjacent sector in the inner direction of a particular sector", and "a plurality of sectors adjacent to a particular sector in the outward direction and the inward direction". In the following, "to write data in conventional magnetic recording" is sometimes referred to as "to perform conventional magnetic recording", "to perform a conventional magnetic recording process", or simply "to write". In the following, the "conventionally recorded track" is sometimes referred to as a "CMR track".

The read/write control unit 630 performs the write process by shingled write magnetic recording (Shingled write Magnetic Recording: SMR, or Shingled Write Recording: SWR) in which a track to be written next is overwritten in a part of the radial direction of the track written one before in sequentially writing a plurality of tracks. In the following, "to write data in shingled write magnetic recording" is sometimes referred to as "to shingled-record", "to perform a shingled write magnetic recording process", or sometimes simply referred to as "to write". In the following, the "shingled-recorded track" is sometimes referred to as an "SMR track". In the case of shingled write magnetic recording in the user data region 10*a*, the read/write control unit 630 temporarily writes data transferred from the host 100 or any other component to the media cache 10*b*, reads the data temporarily written to the media cache 10*b*, and writes the data read from the media cache 10*b* to the user data region 10*a*.

The read/write control unit 630 performs the conventional magnetic recording process or the shingled write magnetic recording process in response to a command or the like from the host 100. In other words, the read/write control unit 630 selectively performs the conventional magnetic recording process and the shingled write magnetic recording process in response to a command or the like from the host 100. Note that the read/write control unit 630 may be configured to perform the conventional magnetic recording process alone or may be configured to perform the shingled write magnetic recording process alone. For example, the read/write control unit 630 can selectively perform the conventional magnetic recording process or the shingled write magnetic recording process on the plurality of heads 15, e.g., the head 15-0, the head 15-1, and so on in response to a command or the like from the host 100. Note that the magnetic disk device 1 includes a host-managed magnetic disk device in which the user can set in detail a region in which the conventional magnetic recording process and the shingled write magnetic recording process are performed, and a drive-managed magnetic disk device in which the user is not allowed to set a region in which the conventional magnetic recording process and the shingled write magnetic recording process are performed.

Figure 4:
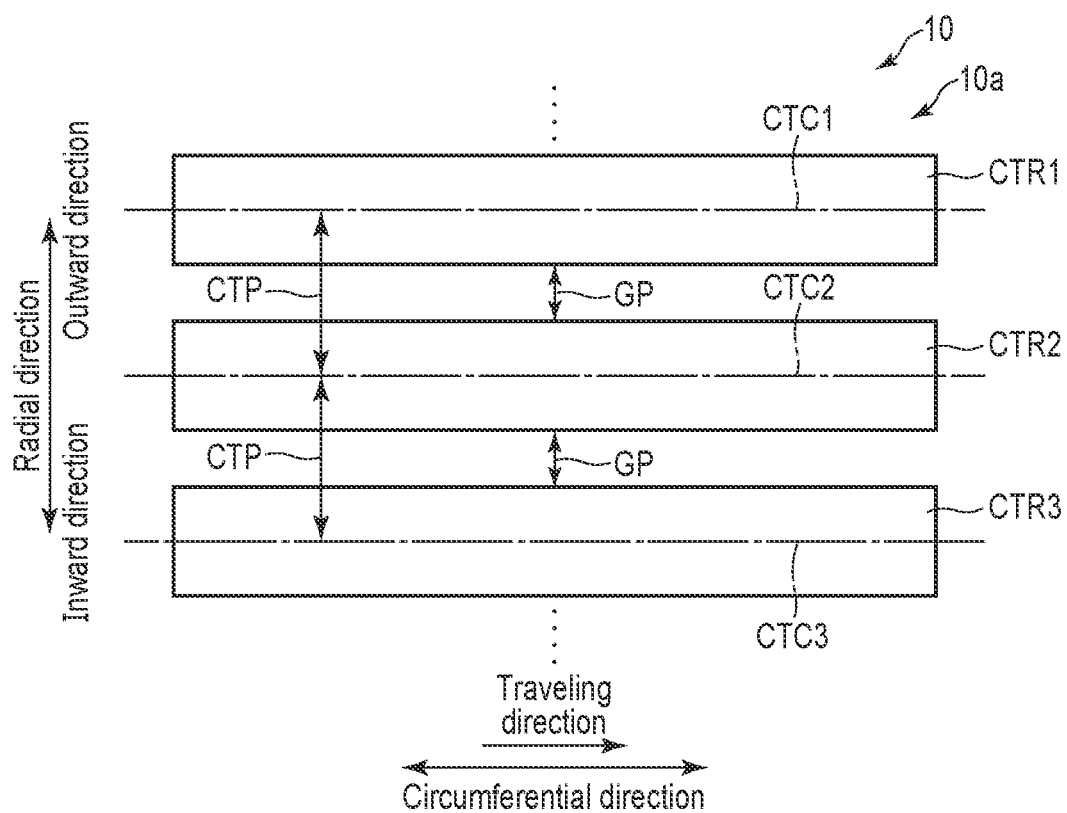
FIG. 4 is a schematic diagram illustrating an example of a conventional magnetic recording process.

FIG. 4 is a schematic diagram illustrating an example of the conventional magnetic recording process. FIG. 4 illustrates a traveling direction. A direction in which the head 15 sequentially writes data to and reads data from the disk 10 in the circumferential direction, i.e., a direction in which the head 15 travels toward the disk 10 in the circumferential direction is sometimes referred to as the traveling direction. For example, the traveling direction is opposite to the rotation direction of the disk 10. Note that the traveling direction may be the same direction as the rotation direction of the disk 10. FIG. 4 illustrates CMR tracks CTR1, CTR2, and CTR3. In FIG. 4, for example, the track widths of the CMR tracks CTR1, CTR2, and CTR3 are the same. Note that the track widths of the CMR tracks CTR1 to CTR3 may be different. The terms such as "the same", "identical", "match", and "equivalent" include the meaning of exactly the same as well as the meaning of being different to the extent that can be regarded as being substantially the same. FIG. 4 illustrates a track center CTC1 of the CMR track CTR1, a track center CTC2 of the CMR track CTR2, and a track center CTC3 of the CMR track CTR3. In the example illustrated in FIG. 4, the CMR tracks CTR1 and CTR2 are written at a track pitch CTP1. The CMR tracks CTR2 and CTR3 are written at a track pitch CTP2. The track center CTC1 of the CMR track CTR1 and the track center CTC2 of the CMR track CTR2 are separated at the track pitch CTP1. The track center CTC2 of the CMR track CTR2 and the track center CTC3 of the track CTR3 are separated at the track pitch CTP2. The track pitches CTP1 and CTP2 may be different or the same. In the following, the track pitch at the time of writing the track is sometimes referred to as a recording pitch. The CMR track CTR1 and the CMR track CTR2 are separated at a gap GP1. The CMR track CTR2 and the CMR track CTR3 are separated at a gap GP2. The gaps GP1 and GP2 may be different or the same. In FIG. 4, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction.

In the example illustrated in FIG. 4, the read/write control unit 630 positions the head 15 at the track center CTC1 in a particular region of the disk 10, e.g., the user data region 10a, and conventionally records the CMR track CTR1 or a particular sector of the CMR track CTR1. The read/write control unit 630 positions the head 15 at the track center CTC2 separated inward from the track center CTC1 of the CMR track CTR1 at the track pitch CTP1 in the user data region 10a, and conventionally records the CMR track CTR2 or a particular sector of the CMR track CTR2. The read/write control unit 630 positions the head 15 at the track center CTC3 separated inward from the track center CTC2 of the CMR track CTR2 at the recording pitch CTP2 in the user data region 10a, and conventionally records the CMR track CTR3 or a particular sector of the CMR track CTR3. The read/write control unit 630 may conventionally record the CMR tracks CTR1, CTR2, and CTR3 sequentially in the inward direction in the order described in a particular region of the disk 10, e.g., the user data region 10a, or may conventionally record the CMR tracks CTR1, CTR2, and CTR3 randomly in a particular sector of the track CTR1, a particular sector of the track CTR2, and a particular sector of the track CTR3.

Figure 5:
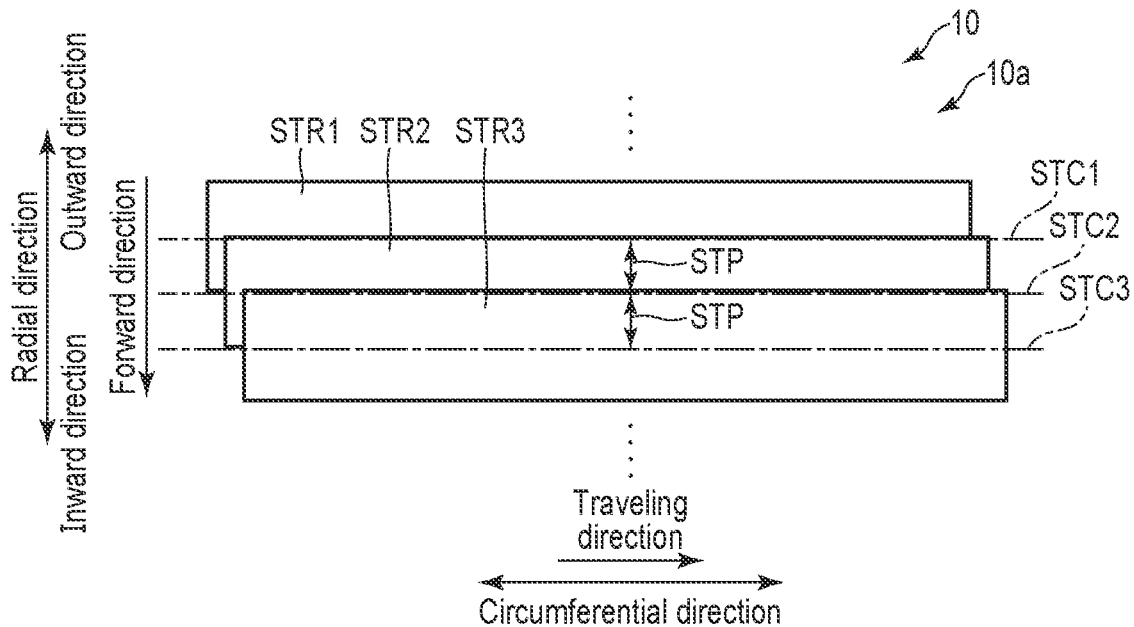
FIG. 5 is a schematic diagram illustrating an example of a shingled write magnetic recording process.

FIG. 5 is a schematic diagram illustrating an example of the shingled write magnetic recording process. FIG. 5 illustrates a forward direction. A direction in which a plurality of tracks is continuously shingle-recorded in the radial direction, i.e., a direction in which a track to be written next is overlapped with a track written one ahead in the radial direction is sometimes referred to as a forward direction. In FIG. 5, although the inward direction in the radial direction is the forward direction, the outward direction in the radial direction may be set as the forward direction. FIG. 5 illustrates a plurality of SMR tracks STR1, STR2, and STR3 continuously overwritten in one direction in the radial direction. In the following, in shingled write magnetic recording, a region in which data is written with the write head 15W is sometimes referred to as a write track, and a remaining region other than a region in which another write track is overwritten in a particular track is sometimes referred to as a read track. FIG. 5 illustrates a track center STC1 of the SMR track STR1 in the case in which another SMR track is not overwritten, a track center STC2 of the SMR track STR2 in the case in which another SMR track is not overwritten, and a track center STC3 of the SMR track STR3 in the case in which another SMR track is not overwritten. In the example illustrated in FIG. 5, the SMR tracks STR1 and STR2 are written at the track pitch (recording pitch) STR1. The SMR tracks STR2 and STR3 are written with a track pitch (recording pitch) STP2. The track center STC1 of the SMR track (or write track) STR1 and the track center STC2 of the SMR track (or write track) STR2 are separated at the recording pitch STP1. The track center STC2 of the SMR track STR2 and the track center STC3 of the SMR track STR3 are separated at the recording pitch STP2. The recording pitches STP1 and STP2 may be different or the same. In FIG. 5, the radial width of the region (read track) in which the SMR track STR2 is not overwritten in the SMR track STR1 and the radial width of the region (read track) in which the SMR track STR3 is not overwritten in the SMR track STR2 are the same. Note that the radial width of the region (read track) in which the SMR track STR2 is not overwritten in the SMR track STR1 and the radial width of the region (read track) in which the SMR track STR3 is not overwritten in the SMR track STR2 may be different. In FIG. 5, for convenience of description, although the tracks are illustrated in a rectangular shape extending in the circumferential direction in a particular track width, the tracks are actually curved along the circumferential direction. The tracks may have a wave shape extending in the circumferential direction varying in the radial direction. Note that in FIG. 5, although three tracks are overwritten, less than three tracks or more than three tracks may be overwritten.

In the example illustrated in FIG. 5, the read/write control unit 630 sequentially shingled-records the SMR tracks STR1 to STR3 in the inward direction. Note that the read/write control unit 630 may sequentially shingled-record the SMR tracks STR1 to STR3 in the outward direction. The read/write control unit 630 writes the SMR track STR2 at the recording pitch STP1 in the inward direction of the SMR track STR1, and overwrites the track STR2 in a part of the inward direction of the SMR track STR1. The read/write control unit 630 writes the SMR track STR3 at the recording pitch STP2 in the inward direction of the SMR track STR2, and overwrites the SMR track STR3 in a part of the inward direction of the SMR track STR2. Note that the read/write control unit 630 may write the SMR track STR2 at the recording pitch STP1 in the outward direction of the SMR track STR1 and overwrite the track STR2 in a part of the inward direction of the SMR track STR1. The read/write control unit 630 may write the SMR track STR3 at the recording pitch STP2 in the outward direction of the SMR track STR2 and overwrite the SMR track STR3 in a part of the inward direction of the SMR track STR2.

The read/write control unit 630 supplies a recording current to the recording coil 180 to excite a recording magnetic field in the main magnetic pole 171 and the write shield 172, supplies element energy, e.g., an assist current or an assist voltage to the assist element, e.g., the STO 200 to generate a radio-frequency magnetic field, and writes (assisted-records) data in a particular region of the disk 10. Note that the read/write control unit 630 may supply a recording current to the recording coil 180 to excite the recording time in the main magnetic pole 171 and the write shield 172, and write data to a particular region of the disk 10 with no assist effect without supplying element energy, e.g., an assist current or an assist voltage, to the assist element, e.g., the STO 200. The read/write control unit 630 adjusts the recording current to be supplied to the plurality of recording coils 180 individually mounted on the plurality of heads 15, e.g., the head 15-0, the head 15-1,..., and adjusts the element energy, e.g., the assist current or the assist voltage, to be supplied to the assist elements 200, e.g., the STOs 200 individually mounted on the plurality of heads 15, e.g., the head 15-0, the head 15-1, and so on.

The read/write control unit 630 can selectively perform conventional magnetic recording or shingled write magnetic recording in assisted recording. In the following, the term "to perform conventional magnetic recording in assisted recording" is sometimes referred to as "to perform assisted/conventional magnetic recording". The term "to perform assisted/conventional magnetic recording" is sometimes simply referred to as "to perform assisted recording", "to perform conventional magnetic recording", or "write". The term "to perform conventional magnetic recording without assisted recording" is sometimes simply referred to as "to perform conventional magnetic recording" or a "write". The term "to perform shingled write magnetic recording in assisted recording" is sometimes referred to as "assisted/shingled write magnetic recording". The term "to perform assisted/shingled write magnetic recording" is sometimes simply referred to as "to perform assisted recording", "to perform shingled write magnetic recording", or "write". The term "to perform shingled write magnetic recording without performing assisted recording" is sometimes simply referred to as "to perform shingled write magnetic recording" or "to write". The read/write control unit 630 selectively performs the assisted/conventional magnetic recording or the assisted/shingled write magnetic recording for each of a plurality of heads, for example, the head 15-0, the head 15-1,....

The life management unit 640 manages the life of the head 15, e.g., the assist element 200. For example, the life of the assist element 200 corresponds to a period until the assist effect disappears, a period until the assist effect decreases to a particular amount, a period until the assist element 200 becomes unusable, a period during which the durability of the assist element 200 decreases to a particular degree, a period during which the deterioration amount of the assist element 200 deteriorates to a particular value, or any other period. The life management unit 640 measures an evaluation index corresponding to the life of the assist element 200. The life management unit 640 measures a plurality of evaluation indexes corresponding to the lives of the plurality of heads 15, e.g., the plurality of assist elements 2200 individually mounted on the head 15-0, 15-1, and so on. The assist element 200 may deteriorate according to the number of times of use of the magnetic disk device 1 or the assist element 200 and the use time of the magnetic disk device 1 or the assist element 200. That is, the life of the assist element 200 is shortened according to the number of times of use of the magnetic disk device 1 or the assist element 200 and the use time of the magnetic disk device 1 or the assist element 200. Therefore, the evaluation index deteriorates according to the number of times of use of the magnetic disk device 1 or the assist element 200 and the use time of the magnetic disk device 1 or the assist element 200. The evaluation index includes, for example, recording quality of data written with a particular head 15, e.g., a bit error rate (BER), and an assist element resistance value of the assist element 200 mounted on the particular head 15.

In the case of determining that the evaluation index (in the following, the index is sometimes referred to as a target evaluation index) corresponding to the particular assist element (in the following, the element is sometimes referred to as a target assist element) 200 mounted on a particular head 15 (in the following, the head is sometimes referred to as a target head) in the plurality of heads 15 is larger than (or exceeds) a threshold (in the following, the threshold is sometimes referred to as an index threshold or a target index threshold) indicating the sign of the reduction or the deterioration of the life of the target assist element 200, the life management unit 640 outputs a signal (in the following, the signal is sometimes referred to as a deterioration signal) indicating the sign of the reduction or the deterioration of the life of the target assist element 200. For example, in the case of determining that the BER (which is sometimes referred to as a target BER below) corresponding to the target head 15 mounted with the target assist element 200 is larger than (or exceeds) a threshold (which is sometimes referred to as a BER threshold or a target BER threshold below) corresponding to the BER indicating a sign of decrease or deterioration of the life of the target assist element 200, the life management unit 640 outputs a deterioration signal. For example, in the case of determining that that the assist element resistance value (in the following, the value is sometimes referred to as a target assist element resistance value) corresponding to the target assist element 200 is larger than (or exceeds) the threshold (in the following, the value is sometimes referred to as a resistance threshold or a target resistance threshold) corresponding to the resistance value indicating the sign of the reduction or deterioration of the life of the target assist element 200, the life management unit 640 outputs the deterioration signal. The evaluation threshold includes the BER threshold and the resistance threshold.

The life management unit 640 outputs a signal (which is sometimes referred to as a record type change signal below) for prompting changing the recording mode of the target head 15 corresponding to the target assist element 200 according to the target evaluation index corresponding to the target assist element 200. In the case of determining that the target evaluation index corresponding to the target assist element 200 is larger than (or exceeds) the target index threshold, the life management unit 640 outputs a signal (which is sometimes referred to as a shingled write magnetic recording change signal below) prompting changing the recording mode of the target head 15 corresponding to the target assist element 200 to shingled write magnetic recording. In the case of determining that the evaluation index corresponding to the target assist element 200 is the index threshold or less, the life management unit 640 outputs a signal (which is sometimes referred to as a conventional magnetic recording change signal below) for prompting changing the recording mode of the target head 15 corresponding to the target assist element 200 to conventional magnetic recording. The recording mode change signal includes a shingled write magnetic recording change signal and a conventional magnetic recording change signal.

In the shingled write magnetic recording process, as compared with the conventional magnetic recording process, the random write is not performed, or the frequency of performing the rewrite process is low in which the data deteriorated due to the influence (Adjacent Track Interference: ATI) caused by the magnetic flux leakage from the head 15 in the case in which the data is written (in the following, the process is sometimes referred to as a refresh process or refreshingly write). Therefore, the frequency of use of the head 15 can be suppressed by performing the shingled write magnetic recording process rather than performing the conventional magnetic recording process. Therefore, the life of the assist element 200 of the head 15 can be extended by performing the shingled write magnetic recording process rather than performing the conventional magnetic recording process.

For example, the life management unit 640 outputs the recording mode change signal corresponding to the target assist element 200 according to the target BER corresponding to the target head 15 mounted with the target assist element 200. For example, in the case of determining that the target BER corresponding to the target head 15 mounted with the target assist element 200 is larger than (or exceeds) the target BER threshold, the life management unit 640 outputs the shingled write magnetic recording change signal corresponding to the target assist element 200. For example, in the case of determining that the target BER corresponding to the target head 15 mounted with the target assist element 200 is the target BER threshold or less, the life management unit 640 outputs the conventional magnetic recording change signal corresponding to the target assist element 200.

For example, the life management unit 640 outputs the recording mode change signal corresponding to the target assist element 200 according to the resistance value of the target assist element corresponding to the target assist element 200. For example, in the case of determining that the resistance value of the target assist element corresponding to the target assist element 200 exceeds the target resistance threshold, the life management unit 640 outputs the shingled write magnetic recording change signal. For example, in the case of determining that the resistance value of the target assist element corresponding to the target assist element 200 is the target resistance threshold or less, the life management unit 640 outputs the conventional magnetic recording change signal.

The life management unit 640 changes the recording mode of the target head 15 corresponding to the target assist element 200 through the read/write control unit 630 according to the target evaluation index corresponding to the target assist element 200. In the case of determining that the target evaluation index corresponding to the target assist element 200 is larger than (or exceeds) the index threshold, the life management unit 640 changes the recording mode of the target head 15 corresponding to the target assist element 200 from conventional magnetic recording to shingled write magnetic recording through the read/write control unit 630, and performs the shingled write magnetic recording process with the target head 15 corresponding to the target assist element 200. In the case of determining that the target evaluation index corresponding to the target assist element 200 is the target index threshold or less, the life management unit 640 changes, through the read/write control unit 630, the recording mode of the target head 15 corresponding to the target assist element 200 from shingled write magnetic recording to conventional magnetic recording, and performs the conventional magnetic recording process with the target head 15 corresponding to the target assist element 200.

For example, the life management unit 640 changes the recording mode of the target head 15 corresponding to the target assist element 200 through the read/write control unit 630 according to the BER corresponding to the target head 15 mounted with the target assist element 200. For example, in the case of determining that the target BER corresponding to the target head 15 mounted with the target assist element 200 is larger than (or exceeds) the target BER threshold, the life management unit 640 changes, through the read/write control unit 630, the recording mode of the target head 15 corresponding to the target assist element 200 from conventional magnetic recording to shingled write magnetic recording, and performs the shingled write magnetic recording process with the target head 15 corresponding to the target assist element 200. For example, in the case of determining that the target BER corresponding to the target head 15 mounted with the target assist element 200 is the target BER threshold or less, the life management unit 640 changes, through the read/write control unit 630, the recording mode of the target head 15 corresponding to the target assist element 200 from shingled write magnetic recording to conventional magnetic recording, and performs the conventional magnetic recording process with the target head 15 corresponding to the target assist element 200.

For example, the life management unit 640 changes the recording mode of the target head 15 corresponding to the target assist element 200 through the read/write control unit 650 according to the resistance value of the target assist element corresponding to the target assist element 200. For example, in the case of determining that the resistance value of the target assist element corresponding to the target assist element 200 is larger than (or exceeds) the target resistance threshold, the life management unit 640 changes the recording mode of the target head 15 corresponding to the target assist element 200 from conventional magnetic recording to shingled write magnetic recording through the read/write control unit 650, and performs the shingled write magnetic recording process with the target head 15 corresponding to the target assist element 200. For example, in the case of determining that the resistance value of the target assist element corresponding to the target assist element 200 is the target resistance threshold or less, the life management unit 640 changes the recording mode of the target head 15 corresponding to the target assist element 200 from shingled write magnetic recording to conventional magnetic recording through the read/write control unit 650, and performs the conventional magnetic recording process with the target head 15 corresponding to the target assist element 200.

Figure 6:
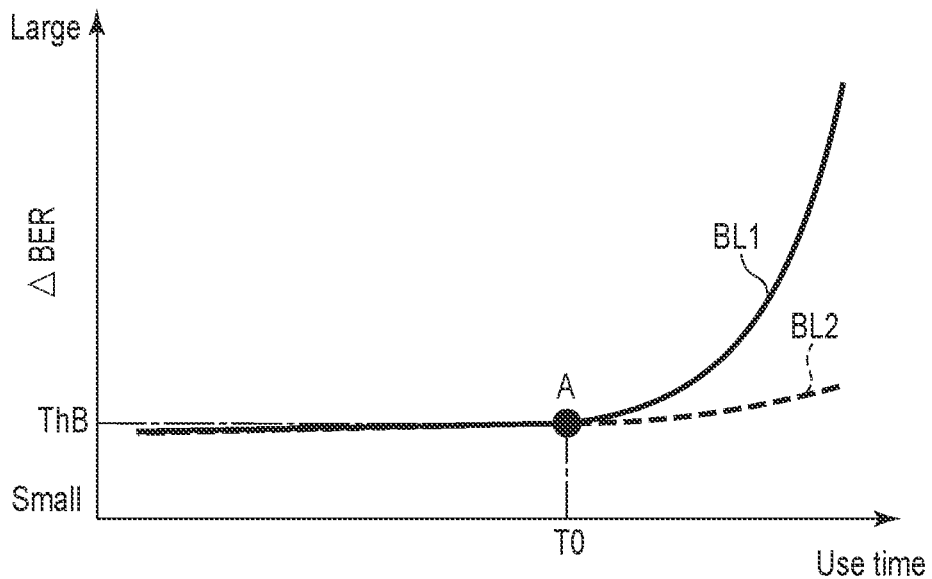
FIG. 6 is a schematic diagram illustrating an example of a change in the difference value of a BER to a use time of the magnetic disk device according to the first embodiment.

FIG. 6 is a schematic diagram illustrating an example of a change in the difference value of the BER to the use time of the magnetic disk device 1 according to the present embodiment. In FIG. 6, the horizontal axis indicates the use time (or the number of times of use) of the magnetic disk device 1 (a particular head 15 or a particular assist element 200), and the vertical axis indicates the difference value (in the following, sometimes referred to as a BER difference value) ΔBER between the current BER and the BER at the start of use of the magnetic disk device 1 (the particular head 15 or the particular assist element 200) corresponding to the particular head 15 of the magnetic disk device 1. In the horizontal axis in FIG. 6, BER difference value increases toward the tip end side of the arrow and decreases toward the side opposite to the tip end side of the arrow. The vertical axis in FIG. 6 indicates the evaluation threshold, for example, a BER threshold ThB. In the horizontal axis in FIG. 6, the use time elapses as it goes toward the tip end side of the arrow. The horizontal axis in FIG. 6 indicates the evaluation threshold, for example, use time T0 (or the number of times of use) corresponding to the BER threshold ThB. FIG. 6 illustrates a change BL1 (in the following, the change is sometimes referred to as a change in the BER difference value at the time of conventional magnetic recording) of the BER difference value (ΔBER) to the use time (or the number of times of use) of the magnetic disk device 1 (the particular head 15 or the particular assist element 200) in the case of case of conventional magnetic recording on the disk 10, and a change BL2 (in the following, the change is sometimes referred to as a change in the BER difference value at the time of shingled write magnetic recording) of the BER difference value (ΔBER) to the use time (or the number of times of use) of the magnetic disk device 1 (the particular head 15 or the particular assist element 200) in the case of shingled write magnetic recording on the disk 10. The change BL1 in the BER difference value during conventional magnetic recording and the change BL2 in the BER difference value during shingled write magnetic recording include a point A corresponding to the BER threshold ThB.

In the example illustrated in FIG. 6, the change in the change BL2 in the BER difference value during shingled write magnetic recording more gently changes than in the change BL1 in the BER difference value during conventional magnetic recording from the point A. That is, in the case in which the BER difference value corresponding to the particular head 15 exceeds the BER threshold ThB, the recording mode of the head 15 is changed from conventional magnetic recording to shingled write magnetic recording, and thus the change in the BER difference value corresponding to the head 15 can be made gentle. In the case in which the BER difference value corresponding to the particular head 15 exceeds the BER threshold ThB, a recording mode of the head 15 is changed from conventional magnetic recording to shingled write magnetic recording, and thus the life of the assist element 200 mounted on the head 15 can be extended. Therefore, in the case in which the BER difference value corresponding to the particular head 15 exceeds the BER threshold, a recording mode of the head 15 is changed from conventional magnetic recording to shingled write magnetic recording, and thus the life of the magnetic disk device 1 mounted on the head 15 can be extended.

Figure 7:
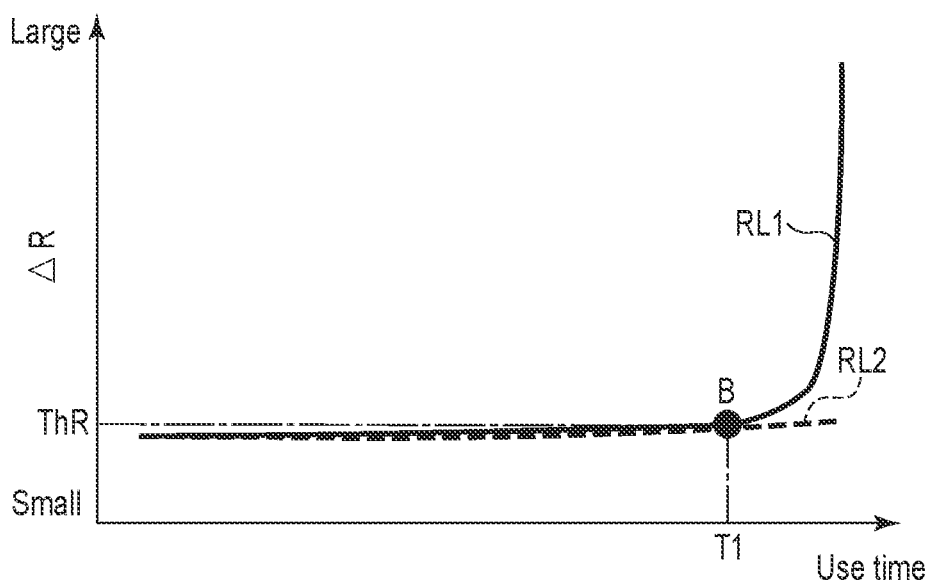
FIG. 7 is a schematic diagram illustrating an example of a change in the difference value of an assist element resistance value to a use time of the magnetic disk device according to the first embodiment.

FIG. 7 is a schematic diagram illustrating an example of a change in the difference value of the assist element resistance value to the use time of the magnetic disk device 1 according to the present embodiment. In FIG. 7, the horizontal axis indicates the use time (or the number of times of use) of the magnetic disk device 1 (a particular head 15 or a particular assist element 200), and the vertical axis indicates a difference value (in the following, the value is sometimes referred to as a resistance difference value) ΔR between the current assist element resistance value and the assist element resistance value at the start of use of the magnetic disk device 1 (the particular head 15 or the particular assist element 200) corresponding to the particular assist element 200 mounted on the particular head 15 of the magnetic disk device 1. In the horizontal axis in FIG. 7, the index increases toward the tip end side of the arrow and decreases toward the side opposite to the tip end side of the arrow. The vertical axis in FIG. 7 indicates the evaluation threshold, for example, the resistance threshold ThR. In the horizontal axis in FIG. 7, the use time elapses as it goes toward the tip end side of the arrow. The horizontal axis in FIG. 7 indicates the evaluation threshold, for example, use time T1 (or the number of times of use) corresponding to the resistance threshold ThR. FIG. 7 illustrates a change RL1 (in the following, the change is sometimes referred to as a change in a resistance difference value during conventional magnetic recording) of the resistance difference value (ΔR) to the use time (or the number of times of use) of the magnetic disk device 1 (the particular head 15 or the particular assist element 200) in the case of conventional magnetic recording on the disk 10, and a change RL2 (in the following, the change is sometimes referred to as a change in a resistance difference value at the time of shingled write magnetic recording) of the resistance difference value (ΔR) to the use time (or the number of times of use) of the magnetic disk device 1 (the particular head 15 or the particular assist element 200) in the case of shingled write magnetic recording on the disk 10. The change RL1 in the resistance difference value at the time of the conventional magnetic recording and the change RL2 in the resistance difference value at the time of the shingled write magnetic recording include a point B corresponding to the resistance threshold ThR.

In the example illustrated in FIG. 7, the change in the change RL2 in the resistance difference value at the time of shingled write magnetic recording changes more gently than in the change RL1 in the resistance difference value at the time of conventional magnetic recording from the point B. That is, in the case in which the resistance difference value corresponding to the particular assist element 200 of the particular head 15 exceeds the resistance threshold ThR, the recording mode of the head 15 is changed from conventional magnetic recording to shingled write magnetic recording, and thus the change in the resistance difference value corresponding to the assist element 200 can be made gentle. In the case in which the resistance difference value corresponding to the particular assist element 200 of the particular head 15 exceeds the resistance threshold ThR, a recording mode of the head 15 is changed from conventional magnetic recording to shingled write magnetic recording, and thus the life of the assist element 200 mounted on the head 15 can be extended. Therefore, in the case in which the resistance difference value corresponding to the particular head 15 exceeds the resistance threshold value ThR, a recording mode of the head 15 is changed from conventional magnetic recording to shingled write magnetic recording, and thus the life of the magnetic disk device 1 mounted on the head 15 can be extended.

Figure 8:
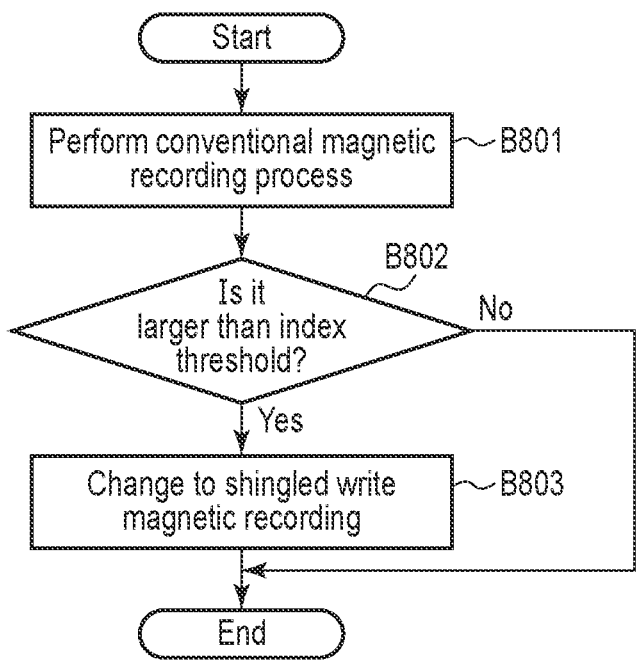
FIG. 8 is a flowchart illustrating an example of a method of changing a recording mode of a target head according to the life of the assist element according to the first embodiment.

FIG. 8 is a flowchart illustrating an example of a method of changing a recording mode of the target head 15 according to the life of the assist element 200 according to the present embodiment.

The MPU 60 performs an assisted/conventional magnetic recording process on a particular region of the disk 10 with the target head 15 in the plurality of heads 15 (B801). The MPU 60 determines whether the target evaluation index corresponding to the target head 15 is larger than the target index threshold or equal to or smaller than the target index threshold (B802). For example, the MPU 60 determines whether the BER (or the BER difference value) corresponding to the target head 15 is larger than a BER threshold or equal to or smaller than the BER threshold. For example, the MPU 60 determines whether the assist element resistance value corresponding to the target assist element 200 mounted on the target head 15 is larger than the resistance threshold or equal to or smaller than the resistance threshold.

In the case of determining that the target evaluation threshold is the target index threshold or less (NO in B802), the MPU 60 ends the process. For example, in the case of determining that the target BER (or the BER difference value) is the target BER threshold or less, the MPU 60 ends the process. For example, in the case of determining that the resistance value of the target assist element is the target resistance threshold or less, the MPU 60 ends the process.

In the case of determining that the target evaluation threshold is larger than the target index threshold (YES in B802), the MPU 60 ends the process of changing the recording mode of the target head 15 from conventional magnetic recording to shingled write magnetic recording to perform the assisted/shingled write magnetic recording process with the target head 15 (B803). For example, in the case of determining that the target BER (or the BER difference value) is larger than the target BER threshold, the MPU 60 changes a recording mode of the target head 15 from conventional magnetic recording to shingled write magnetic recording, performs the assisted/shingled write magnetic recording process with the target head 15, and ends the process. For example, in the case of determining that the resistance value of the target assist element is larger than the target resistance threshold, the MPU 60 changes a recording mode of the target head 15 from conventional magnetic recording to shingled write magnetic recording, performs the assisted/shingled write magnetic recording process with the target head 15, and ends the process.

According to the present embodiment, the magnetic disk device 1 performs the assisted/conventional magnetic recording process on a particular region of the disk 10 with the target head 15 in the plurality of heads 15. In the case of determining that the target evaluation index corresponding to the target head 15 is larger than the target index threshold, the magnetic disk device 1 changes the recording mode of the target head 15 from conventional magnetic recording to shingled write magnetic recording, and performs the assisted/shingled write magnetic recording process with the target head 15. For example, in the case of determining that the target BER (or the BER difference value) corresponding to the target head 15 is larger than the target BER threshold, the magnetic disk device 1 changes the recording mode of the target head 15 from conventional magnetic recording to shingled write magnetic recording and performs the assisted/shingled write magnetic recording process with the target head 15. For example, in the case of determining that the resistance value of the target assist element is larger than the target resistance threshold, the magnetic disk device 1 changes the recording mode of the target head 15 from conventional magnetic recording to shingled write magnetic recording and performs the assisted/shingled write magnetic recording process with the target head 15. The magnetic disk device 1 changes the recording mode of the target head 15 from conventional magnetic recording to shingled write magnetic recording in a particular region of the disk 10 with the target head 15 in the plurality of heads 15, and performs the assisted/shingled write magnetic recording process with the target head 15, and thus the frequency of use of the target head 15 can be suppressed because random write is not performed or the execution frequency of the refresh process is reduced. Therefore, the magnetic disk device 1 can extend the life of the target head 15. That is, the life of the magnetic disk device 1 can be extended. Accordingly, the magnetic disk device 1 enables the improvement of reliability.

Next, magnetic disk devices according to a modification of the first embodiment and another embodiment will be described. In the modification and another embodiment, the same components as those of the first embodiment described above are designated with the same reference numerals, and the detailed description is omitted.

First Modification

A magnetic disk device 1 according to a first modification is different from the magnetic disk device 1 according to the first embodiment in that data is writable in Thermally Assisted Magnetic Recording (TAMR).

Figure 9:
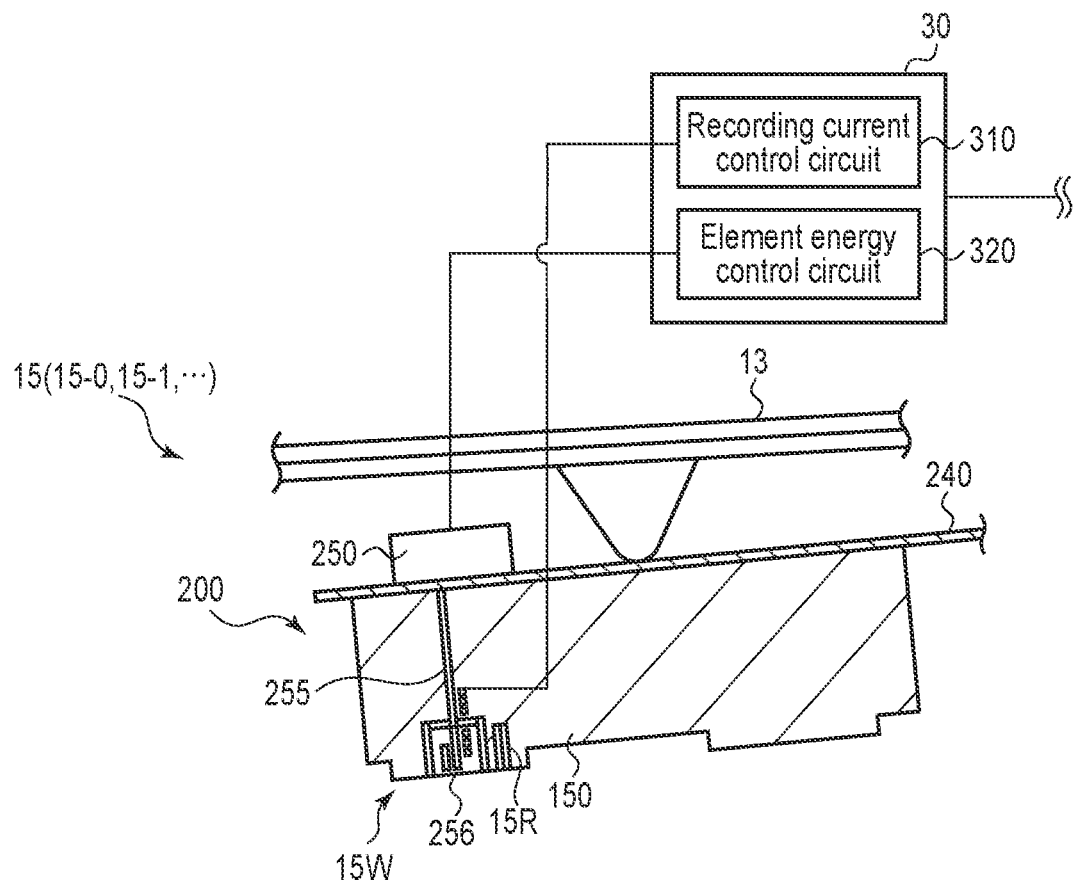
FIG. 9 is an enlarged cross-sectional view illustrating an example of a head according to a first modification.

FIG. 9 is an enlarged cross-sectional view illustrating an example of a head 15 according to the first modification.

In the example illustrated in FIG. 9, a slider 150 includes a write head 15W, a read head 15R, a light generating element (e.g., a laser diode) 250, a waveguide 255, and a near-field light application element (plasmon generator or near-field transducer) 256.

The light generating element 250 is a (laser) light source, and is provided on the upper part of the slider 150 or a gimbal. The light generating element 250 supplies light to the waveguide 255 by applying a current, voltage, or the like from the head amplifier IC 30. Note that the light generating element 250 may be provided in a place other than the slider 150 or the gimbal. For example, the light generating element 250 may be provided outside the arm 13 and the head 15. The waveguide 255 propagates the light generated by the light generating element 250 to the near-field light application element 256.

The near-field light application element 256 is provided at the lower end of the slider 150 facing the disk 10. When writing data to the disk 10, the near-field light application element 256 generates near-field light from the laser light propagated through the waveguide 255 and applies the near-field light to the disk 10. The applied near-field light heats the recording layer of the disk 10 and reduces the coercive force of the recording layer of the disk 10. The near-field light application element 256 includes a metal member. Note that instead of the near-field light application element 256, a lens that condenses light propagating from the light generating element 250 on the disk 10 may be provided. As described above, near-field light generated from the near-field light application element 256 is applied to the disk 10, and thus the magnetic disk device 1 enables magnetic recording of high density to the disk 10 that is a high-coercive force medium. In the following, the write process of writing data by supplying a particular voltage or a particular current to the light generating element 250 is sometimes referred to as assisted recording or thermally assisted recording. Note that a configuration for performing thermally assisted recording, for example, the light generating element (e.g., a laser diode) 250, the waveguide 255, the near-field light application element (a plasmon generator or a near-field transducer) 256, and any other component is sometimes referred to as an assist element 200.

The near-field light application element 256 defines the track width (or recording width) to be written with the write head 15W according to the application range (or the range is sometimes referred to as a spot range or a heat distribution width) of the near-field light. That is, the track width corresponds to the width of the application range of the near-field light. For example, in the case in which the near-field light application element 256 applies the near-field light in the application range in a width smaller than the width of the write head 15W, the track width of the track written with the write head 15W can be made smaller than the width of the write head 15W. In the case in which the near-field light application element 256 applies the near-field light in the application range in a width larger than the width of the write head 15W, the track width of the track written with the write head 15W can be larger than the width of the write head 15W. Therefore, in the case in which the shape of the near-field light application element changes due to a factor such as heat produced in the application of the near-field light, the application range of the near-field light varies, and the track width of the track written with the write head 15W changes correspondingly. For example, in the case of increasing the current (bias current, drive current, or assist current) or the voltage (referred to as a bias voltage, a drive voltage, or an assist voltage) to be supplied to the light generating element 250, the intensity of the near-field light applied from the near-field light application element 256 increases, and the thermal assist effect can be improved, and the application range and the track width can also increase.

According to the first modification, the magnetic disk device 1 can write data in thermally assisted magnetic recording (TAMR). Thus, the magnetic disk device 1 enables the improvement of reliability.

Second Modification

A magnetic disk device 1 according to a second modification is different from the magnetic disk device 1 according to the above-described embodiment and the first modification in that in the case in which the shingled write magnetic recording process is performed with a target head 15, an assist current (or an assist voltage) corresponding to the target head 15 is reduced.

In the case of determining that the target evaluation index corresponding to a target assist element 200 mounted on the target head 15 is larger than (or exceeds) the target index threshold and changing the recording mode of the target head 15 from conventional magnetic recording to shingled write magnetic recording, the MPU 60 changes (or adjusts) the assist current (the following, the current is sometimes referred to as a target assist current) or the assist voltage (in the following, the voltage is sometimes referred to as a target assist voltage), which is supplied to the target assist element 200, to the assist current (in the following, the current is sometimes referred to as a shingled write magnetic recording assist current or a target shingled write magnetic recording assist current) or an assist voltage (in the following, the voltage is sometimes referred to as a shingled write magnetic recording assist voltage or a target shingled write magnetic recording assist voltage), which is supplied to the target assist element 200 at the time of performing the shingled write magnetic recording process and is smaller than the assist current (in the following, the current is sometimes referred to as a conventional magnetic recording assist current or a target conventional magnetic recording assist current) or the assist voltage (in the following, the voltage is sometimes referred to as a conventional magnetic recording assist voltage or a target conventional magnetic recording assist voltage) supplied to the target assist element 200 at the time of performing the conventional magnetic recording process. At this time, the MPU 60 changes (or adjusts) the recording current (in the following, the current is sometimes referred to as a target recording current) or the recording voltage (in the following, the voltage is sometimes referred to as a target recording voltage), which is supplied to a recording coil 180 of the target head 15, to the recording current (in the following, the current is sometimes referred to as a conventional magnetic recording current or a target conventional magnetic recording current) or the recording voltage (in the following, the voltage is sometimes referred to as a shingled write magnetic recording voltage or a target shingled write magnetic recording voltage), which is supplied to the recording coil 180 of the target head 15 at the time of performing the shingled write magnetic recording process and is larger than the recording current (in the following, the current is sometimes referred to as a shingled write magnetic recording current or a target shingled write magnetic recording current) or the recording voltage (in the following, the voltage is sometimes referred to as a conventional magnetic recording voltage or a target conventional magnetic recording voltage) supplied to the recording coil 180 of the target head 15 at the time of performing the conventional magnetic recording process. The change amount (in the following, the amount is sometimes referred to as a change amount of the recording quality at the time of changing from the conventional magnetic recording current (or the conventional magnetic recording voltage) to the shingled write magnetic recording current (or the shingled write magnetic recording voltage)) of the recording quality of the data written with the target head 15 at the time of changing from the target conventional magnetic recording current (or the target conventional magnetic recording voltage) to the target shingled write magnetic recording current (or the target shingled write magnetic recording voltage) corresponds to the change amount (in the following, the amount is sometimes referred to as a change amount of the recording quality at the time of changing the conventional magnetic recording assist current (or the conventional magnetic recording assist voltage) to the shingled write magnetic recording assist current (or the shingled write magnetic recording assist voltage)) of the recording quality of the write data with the target head 15 at the time of changing the target conventional magnetic recording assist current (or the target conventional magnetic recording assist voltage) to the target shingled write magnetic recording assist current (or the target shingled write magnetic recording assist voltage).

In the case in which the recording mode of the target head 15 corresponding to the target assist element 200 is changed from conventional magnetic recording to shingled write magnetic recording, the MPU 60 reduces the target assist current or the target assist voltage to be supplied to the target assist element 200 from the target conventional magnetic recording assist current or the target conventional magnetic recording assist voltage to the target shingled write magnetic recording assist current or the target shingled write magnetic recording assist voltage, and increases the target recording current or the target recording voltage to be supplied to the recording coil 180 of the target head 15 from the target conventional magnetic recording current or the target conventional magnetic recording voltage to the target shingled write magnetic recording current or the target shingled write magnetic recording voltage so as to compensate the change amount of the recording quality at the time of writing data with the target head 15 that changes due to the reduction of the target conventional magnetic recording assist current or the target conventional magnetic recording assist voltage to the target shingled write magnetic recording assist current or the target shingled write magnetic recording assist voltage.

FIG. 10 is a flowchart illustrating an example of a method of changing a recording mode of the target head 15 according to the life of the assist element 200 according to the second modification.

The MPU 60 performs an assisted/conventional magnetic recording process on a particular region of the disk 10 with the target head 15 in the plurality of heads 15 (B801). The MPU 60 determines whether the target evaluation index corresponding to the target head 15 is larger than the target index threshold or equal to or smaller than the target index threshold (B802).

In the case of determining that the target evaluation threshold is the target index threshold or less (NO in B802), the MPU 60 ends the process.

In the case of determining that the target evaluation threshold is larger than the target index threshold (YES in B802), the MPU 60 changes the recording mode of the target head 15 from conventional magnetic recording to shingled write magnetic recording, and performs the assisted/shingled write magnetic recording process with the target head 15 (B803).

The MPU 60 reduces the target assist current (or the target assist voltage) supplied to the target assist element 200 corresponding to the target head 15 from the target conventional magnetic recording assist current (or the target conventional magnetic recording assist voltage) to the target shingled write magnetic recording assist current (or the target shingled write magnetic recording assist voltage) (B1001). The MPU 60 increases the target recording current (or the target recording voltage) supplied to the recording coil 180 of the target head 15 from the target conventional magnetic recording current (or the target conventional magnetic recording voltage) to the target shingled write magnetic recording current (or the target shingled write magnetic recording voltage) so as to compensate the change amount of the recording quality at the time of writing data with the target head 15 that changes due to the reduction in the target shingled write magnetic recording assist current (or the target conventional magnetic recording assist voltage) from the target conventional magnetic recording assist current (or the target conventional magnetic recording assist voltage), and ends the process.

According to the second modification, in the case in which the recording mode of the target head 15 is changed from conventional magnetic recording to shingled write magnetic recording, the magnetic disk device 1 reduces the target assist current or the target assist voltage supplied to the target assist element 200 corresponding to the target head 15 from the target conventional magnetic recording assist current or the target conventional magnetic recording assist voltage to the target shingled write magnetic recording assist current or the target shingled write magnetic recording assist voltage. The magnetic disk device 1 increases the target recording current or the target recording voltage supplied to the recording coil 180 of the target head 15 from the target conventional magnetic recording assist current or the target conventional magnetic recording assist voltage to the target shingled write magnetic recording current or the target shingled write magnetic recording voltage so as to compensate the change amount of the recording quality at the time of writing data with the target head 15 that changes due to the reduction in the target shingled write magnetic recording assist current or the target shingled write magnetic recording assist voltage from the target conventional magnetic recording assist current or the target conventional magnetic recording assist voltage. Therefore, the magnetic disk device 1 can extend the life of the target head 15. That is, the life of the magnetic disk device 1 can be extended. Accordingly, the magnetic disk device 1 enables the improvement of reliability.

Third Modification

A magnetic disk device 1 according to a third modification is different from the magnetic disk device 1 according to the above-described embodiment and the first modification in that, in the case in which the shingled write magnetic recording process is performed with the target head 15 in the plurality of heads 15, writing is performed in the media cache 10b with another head 15 different from a target head 15 in a plurality of heads 15, and writing is performed in a user data region 10a with the target head 15.

In the case of determining that the target evaluation index corresponding to a target assist element 200 mounted on the target head 15 in the plurality of heads has exceeded the target index threshold and the recording mode of the target head 15 is changed from conventional magnetic recording to shingled write magnetic recording, an MPU 60 selects a head (in the following, the head is sometimes referred to as another head) 15 different from the target head 15 in the plurality of heads 15 mounted with an assist element (in the following, the assist element is sometimes referred to as another assist element) 200 having the evaluation index (in the following, the evaluation index is sometimes referred to as another evaluation index) that is the index threshold or less (in the following, the threshold is sometimes referred to as another index threshold). The MPU 60 temporarily writes, with the selected other head 15, data transferred from a host 100 or any other component to the media cache (in the following, the cache is sometimes referred to as another media cache) 10b of the surface (in the following, the surface is sometimes referred to as another surface) of a disk 10 facing the other head 15, reads data written to the other media cache 10b with the other head 15, and assisted/shingled-records data read from the other media cache 10b with the other head 15, to the user data region (in the following, the region is sometimes referred to as a target user data region) 10a of the surface (in the following, the surface is sometimes referred to as a target surface) of the disk 10 facing the target head 15 with the target head 15.

For example, in FIG. 2, in the case of determining that the target evaluation index corresponding to the target assist element 200 mounted on a target head 15-0 is larger than (or exceeds) the target evaluation threshold and changes the recording mode of the target head 15-0 from conventional magnetic recording to shingled write magnetic recording, the MPU 60 selects another head 15-1 mounted with another assist element 200 having another evaluation index equal to or smaller than another evaluation threshold. The MPU 60 temporarily writes the data transferred from the host 100 or any other component in the media cache 10b1 with the selected other head 15-1, reads the data written in the media cache 10b1 with the other head 15-1, and assisted/shingled-records the data read from the media cache 10b1 with the other head 15-1 in the user data region 10a0 with the target head 15-0.

FIG. 11 is a flowchart illustrating an example of a method of changing a recording mode of the particular head 15 according to the life of the assist element 200 according to the third modification.

The MPU 60 performs an assisted/conventional magnetic recording process on a particular region of the disk 10 with the target head 15 in the plurality of heads 15 (B801). The MPU 60 determines whether the target evaluation index corresponding to the target head 15 is larger than the target index threshold or equal to or smaller than the index threshold (B802).

In the case of determining that the target evaluation threshold is the target index threshold or less (NO in B802), the MPU 60 ends the process.

In the case of determining that the target evaluation threshold is larger than the target index threshold (YES in B802), the MPU 60 changes the recording mode of the target head 15 from conventional magnetic recording to shingled write magnetic recording, and performs the assisted/shingled write magnetic recording process with the target head 15 (B803).

The MPU 60 determines whether there is another head 15 having another evaluation index equal to or lower than another index threshold in the plurality of heads 15 or there is no other head 15 (B1101). In the case of determining that there is no other head 15 (NO in B1101), the MPU 60 ends the process. In the case of determining that there is another head 15 (YES in B1101), the MPU 60 selects another head 15 from the plurality of heads 15 (B1102).

The MPU 60 writes the data transferred from the host 100 or any other component to the other media cache 10b with the selected other head 15, and reads the data written from the other media cache 10b with the other head 15 (B1103). The MPU 60 assisted/shingled-records the data, which is read from the other media cache 10b with the other head 15, to the target user data region 10a with the target head 15 (B1104), and ends the process.

According to the third modification, in the case in which the recording mode of the target head 15 is changed from conventional magnetic recording to shingled write magnetic recording, the magnetic disk device 1 selects another head 15 from the plurality of heads 15. The magnetic disk device 1 writes the data transferred from the host 100 or any other component to the other media cache 10b with the selected other head 15, and reads the data written from the other media cache 10b with the other head 15. In the magnetic disk device 1, the data read from the other media cache 10b with the other head 15 is assisted/shingled-recorded to the target user data region 10a with the target head 15. Therefore, the magnetic disk device 1 can extend the life of the target head 15. That is, the life of the magnetic disk device 1 can be extended. Accordingly, the magnetic disk device 1 enables the improvement of reliability.

Note that the configurations of the above-described embodiment and modifications can be applied to a host-managed magnetic disk device and a drive-managed magnetic disk device.

Second Embodiment

A magnetic disk device 1 according to a second embodiment is different from the magnetic disk device 1 of the first embodiment, the first modification, the second modification, and the third modification described above in the write process method.

In the case in which particular data is written in a target recording region (in the following, the region is sometimes referred to as a target recording region) of the disk 10 with the target head 15 through the read/write control unit 630, the life management unit 640 temporarily writes a part or all of the data in a recording region (in the following, the region is sometimes referred to as another recording region) different from the target recording region with another head 15, and writes data, which is written in the other recording region with another head 15, to the target recording region with the target head 15. In the following, the term "to temporarily write particular data of a particular region to a region different from the particular region" is sometimes referred to as "to save". In the case in which particular data is written in the target recording region of the disk 10 with the target head 15 through the read/write control unit 630, the life management unit 640 saves a part or all of the data in another recording region with another head 15, and writes the data, which is saved in another recording region with another head 15, to the target recording region with the target head 15.

For example, the life management unit 640 temporarily writes the data transferred from the host 100 to the other media cache region 10b of the other surface with the other head 15 before writing the data to the target user data region 10a of the target surface with the target head 15 through the read/write control unit 630, reads the data written to the other media cache region 10b with the other head 15, and writes the data read from the other media cache 10b with the other head 15 to the target user data region 10a of the target surface of the disk 10 with the target head 15. In other words, the life management unit 640 saves the data transferred from the host 100 to the other media cache region 10b of the other surface with the other head 15 before the target head 15 writes the data to the target user data region 10a of the target surface through the read/write control unit 630, reads the data saved in the other media cache region 10b with the other head 15, and writes the data read from the other media cache 10b with the other head 15 to the target user data region 10a of the target surface of the disk 10 with the target head 15.

For example, in the case in which an access frequency corresponding to the number of times of access to data written to a particular region (in the following, the region is sometimes referred to as a rewriting region) of the target user data region 10a of the target surface, for example, a particular track (in the following, the track is sometimes referred to as a rewriting track) within a certain period is a particular number of times (in the following, the number of times is sometimes referred to as an access frequency threshold) or less, the life management unit 640 performs, through the read/write control unit 630, the refresh process of temporarily writing the data to the other media cache region 10b of the other surface with the other head 15, reading the data written to the other media cache region 10b with the other head 15, and rewriting the data read from the other media cache region 10b with the other head 15 to the rewriting region of the target user data region 10a of the target surface of the disk 10, for example, the rewriting track with the target head 15. In other words, the life management unit 640 performs, through the read/write control unit 630, the refresh process of saving the data to the other media cache region 10b of the other surface with the other head 15, reading the data saved to the other media cache region 10b with the other head 15, and rewriting the data read from the other media cache region 10b with the other head 15 to the rewriting region of the target user data region 10a of the target surface of the disk 10 with the target head 15 in the case in which the access frequency is the access frequency threshold or less for the data written in the rewriting region of the target user data region 10a of the target surface.

FIG. 12 is a schematic diagram illustrating an example of a write process method according to the second embodiment.

An MPU 60 performs a write process (B1201) and selects another head 15 (B1202). The MPU 60 saves particular data to another recording region with another head 15 (B1203), writes the data saved to the other recording region with another head 15 to the target recording region with the target head 15 (B1204), and ends the process. For example, before the target head 15 writes the data transferred from the host 100 to the target user data region 10a of the target surface, the MPU 60 saves the data to the other media cache region 10b of the other surface with the other head 15, reads the data saved to the other media cache region 10b with the other head 15, and writes the data read from the other media cache 10b with the other head 15 to the target user data region 10a of the target surface of the disk 10 with the target head 15. For example, the MPU 60 performs, through the read/write control unit 630, the refresh process of saving the data to the other media cache region 10b of the other surface with the other head 15, reading the data saved to the other media cache region 10b with the other head 15, and rewriting the data read from the other media cache region 10b with the other head 15 to the rewriting region of the target user data region 10a of the target surface of the disk 10 with the target head 15 in the case in which the access frequency is the access frequency threshold or less to the data written in the rewriting region of the target user data region 10a of the target surface.

According to the second embodiment, the magnetic disk device 1 saves data to be written with the target head 15 in the target recording region to another recording region with the other head 15, and writes data saved with the other head 15 in the other recording region to the target recording region with the target head 15. The magnetic disk device 1 can suppress the frequency of use of the target head 15. Therefore, the magnetic disk device 1 can extend the life of the target head 15. That is, the life of the magnetic disk device 1 can be extended. Accordingly, the magnetic disk device 1 enables the improvement of reliability.

Fourth Modification

A magnetic disk device 1 according to a fourth modification is different from the magnetic disk device 1 according to the second embodiment described above in the write process method.

In the case in which particular data is written in the target recording region of a disk 10 with a target head 15 through a read/write control unit 630 according to the target evaluation index corresponding to a target assist element 200, a life management unit 640 temporarily writes a part or all of the data in another recording region with another head 15, and writes data, which is temporarily written in another recording region with another head 15, to the target recording region with the target head 15. In other words, in the case in which the particular data is written in the target recording region of the disk 10 with the target head 15 through the read/write control unit 630 according to the target evaluation index corresponding to the target assist element 200, the life management unit 640 saves a part or all of the data in another recording region with another head 15, and writes the data, which is saved in another recording region with another head 15, to the target recording region with the target head 15.

In the case of determining that (the change amount of) the target evaluation index corresponding to the target assist element 200 is larger than (or exceeds) the threshold of the target index (the change amount of the target evaluation index), the life management unit 640 selects, through the read/write control unit 630, another head 15 mounted with another assist element 200 in which (the change amount of) another evaluation index is equal to or smaller than (the change amount of) another index threshold. For example, in the case of determining that (the change amount of) the target evaluation index is larger than (or exceeds) the threshold of (the change amount of) the target evaluation index, the life management unit 640 selects, through the read/write control unit 630, another head 15 in which (the change amount of) another evaluation index is smaller than (the change amount of) the target evaluation index. In other words, in the case of determining that (the change amount of) the target evaluation index is larger than (the change amount of) the other evaluation indexes and larger than (or exceeds) the threshold of (the change amount of) the target index, the life management unit 640 selects, through the read/write control unit 630, the other head 15 in which (the change amount of) the other evaluation index is smaller than (the change amount of) the target evaluation index. The life management unit 640 saves a part or all of the particular data in another recording region with the selected other head 15 through the read/write control unit 630, and writes the data, which is saved in the other recording region with the selected other head 15, to the target recording region with the target head 15. In the case of determining that (the change amount of) the target evaluation index corresponding to the target assist element 200 is the target index or less (the change amount of the target evaluation index) threshold, the life management unit 640 saves, through the read/write control unit 630, a part or all of the particular data in the particular recording region with the target head 15, and writes the data, which is saved in the particular recording region with the target head 15, to the target recording region with the target head 15.

In the case in which particular data is written in the target recording region of the disk 10 with the target head 15 through the read/write control unit 630 according to the target BER corresponding to the target head 15 mounted with the target assist element 200, the life management unit 640 saves a part or all of the data in another recording region with another head 15, and writes the data, which is saved in another recording region with another head 15, to the target recording region with the target head 15. In the case of determining that (the change amount of) the target BER is larger than (or exceeds) (the change amount of) the target BER, the life management unit 640 selects, through the read/write control unit 630, another head 15 mounted with another assist element 200 in which (the change amount of) the other BER corresponding to another head 15 is equal to or less than the threshold (in the following, the threshold is sometimes referred to as another BER threshold) (of the change amount) of the BER corresponding to another head 15. For example, in the case of determining that (the change amount of) the target BER is larger than (or exceeds) the threshold of (the change amount of) the target BER, the life management unit 640 selects, through the read/write control unit 630, another head 15 in which (the change amount of) the other BER is smaller than (the change amount of) the target BER. In other words, in the case of determining that (the change amount of) the target BER is larger than (the change amount of) the other BER and is larger than (or exceeds) the threshold of (the change amount of) the target BER, the life management unit 640 selects, through the read/write control unit 630, the other head 15 in which (the change amount of) the other BER is smaller than (the change amount of) the target BER. The life management unit 640 saves a part or all of the particular data in another recording region with the selected other head 15 through the read/write control unit 630, and writes the data, which is saved in the other recording region with the selected other head 15, to the target recording region with the target head 15. In the case of determining that (the change amount of) the target BER is equal to or less than (the threshold of) the target BER, the life management unit 640 saves a part or all of the particular data in a particular recording region with the target head 15 through the read/write control unit 630, and writes the data, which is saved in the particular recording region with the target head 15, to the target recording region with the target head 15.

In the case in which particular data is written in the target recording region of the disk 10 with the target head 15 through the read/write control unit 630 according to the resistance value of the target assist element corresponding to the target assist element 200, the life management unit 640 saves a part or all of the data in another recording region with another head 15, and writes the data, which is saved in another recording region with another head 15, to the target recording region with the target head 15. In the case of determining that (the change amount of) the resistance value of the target assist element is larger than (or exceeds) the threshold of the target resistance (the change amount of the target resistance value), the life management unit 640 selects, through the read/write control unit 630, another head 15 mounted with another assist element 200 in which (the change amount of) the assist element resistance value (in the following, the value is sometimes referred to as another assist element resistance value) corresponding to another assist element 200 mounted on another head 15 is the resistance threshold or less (in the following, the value is sometimes referred to as another resistance threshold) (the threshold of the change amount of another resistance value) corresponding to another assist element 200. For example, in the case of determining that (the change amount of) the resistance value of the target assist element is larger than (or exceeds) the threshold of the target resistance (the change amount of the target resistance value), the life management unit 640 selects another head 15 in which (the change amount of) the other assist element resistance value is smaller than the threshold of the target resistance (the change amount of the target resistance value) through the read/write control unit 630. In other words, in the case of determining that (the change amount of) the resistance value of the target assist element is larger than (the change amount of) the other assist element resistance value and larger than (or exceeds) the target resistance (the change amount of) threshold, the life management unit 640 selects the other head 15 in which (the change amount of) the other assist element resistance value is smaller than (the change amount of) the resistance value of the target assist element through the read/write control unit 630. The life management unit 640 saves a part or all of the particular data in another recording region with the selected other head 15 through the read/write control unit 630, and writes the data, which is saved in the other recording region with the selected other head 15, to the target recording region with the target head 15. In the case of determining that (the change amount of) the resistance value of the target assist element is equal to or less than the threshold of the target resistance (the change amount of the target resistance value), the life management unit 640 saves a part or all of the particular data in the particular recording region with the target head 15 through the read/write control unit 630, and writes the data, which is saved in the particular recording region with the target head 15, to the target recording region with the target head 15.

Figure 13:
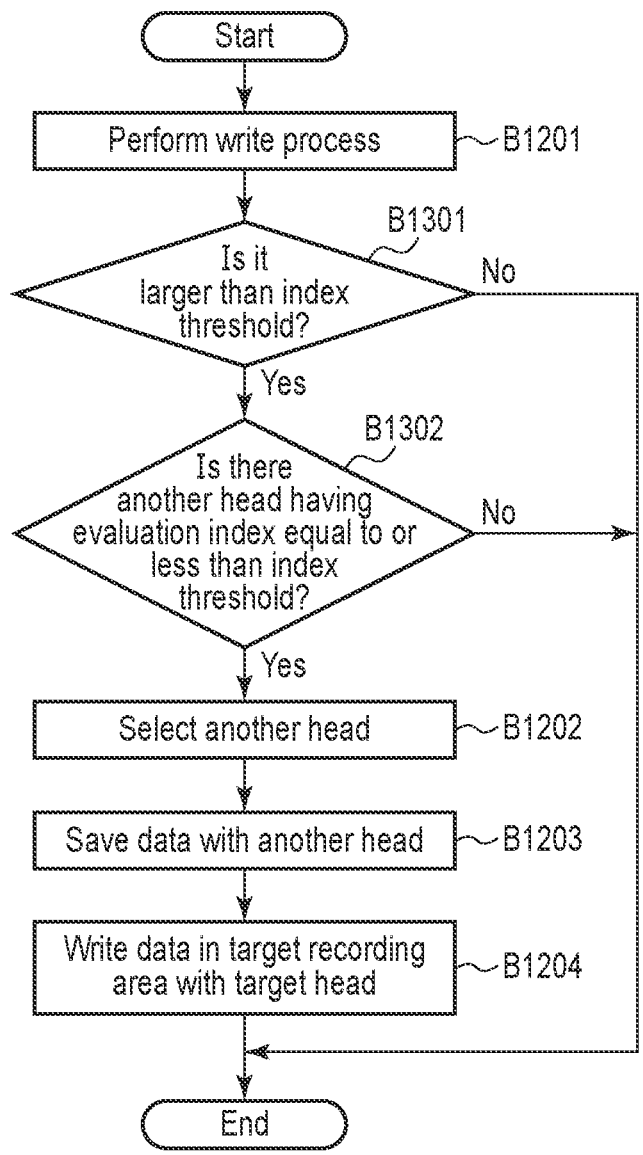
FIG. 13 is a schematic diagram illustrating an example of a write process method according to the fourth modification.

FIG. 13 is a schematic diagram illustrating an example of a write process method according to the fourth modification.

An MPU 60 performs a write process (B1201). The MPU 60 determines whether (the change amount of) the target evaluation index corresponding to the target assist element 200 is larger than the threshold of the target index (the change amount of the target evaluation index) or the threshold of the target evaluation index (the change amount of) is equal to or smaller than the threshold of the target index (the change amount of the target evaluation index) (B1301). In the case of determining that (the change amount of) the target evaluation index is equal to or less than the threshold of the target index (the change amount of the target evaluation index) (NO in B1301), the MPU 60 ends the process. In the case of determining that (the change amount of) the target evaluation index is larger than the threshold of (the change amount of) the target index (YES in B1301), the MPU 60 determines whether there is another head 15 in which (the change amount of) another evaluation index is equal to or less than the threshold of (the change amount of) another index (B1302). In the case of determining that there is no other head 15 in which (change amount of) another evaluation index is equal to or less than the threshold of (the change amount of another evaluation index of) another index (NO of B1302), the MPU 60 ends the process. In the case of determining that there is another head 15 in which (change amount of) another evaluation index is equal to or less than the threshold of (the change amount of another evaluation index of) another index (YES in B1302), the MPU 60 selects another head 15 (B1202). The MPU 60 saves particular data to another recording region with another head 15 (B1203), writes the data saved to the other recording region with another head 15 to the target recording region with the target head 15 (B1204), and ends the process.

According to the fourth modification, in the case of determining that (the change amount of) the target evaluation index corresponding to the target assist element 200 is larger than the threshold of the target index (the change amount of the target evaluation index), the magnetic disk device 1 selects another head 15 mounted with another assist element 200 in which (the change amount of) another evaluation index is equal to or smaller than (the change amount of) another index threshold. The magnetic disk device 1 saves particular data in another recording region with the selected other head 15, and writes the data, which is saved in the other recording region with the selected other head 15, to the target recording region with the target head 15. Therefore, the magnetic disk device 1 can extend the life of the target head 15. That is, the life of the magnetic disk device 1 can be extended. Accordingly, the magnetic disk device 1 enables the improvement of reliability.

Third Embodiment

A magnetic disk device 1 according to a third embodiment is different from the magnetic disk device 1 described in the first embodiment, the second embodiment, the first modification, the second modification, the third modification, and the fourth modification described above on the write process method.

In the case in which particular data is written in the target recording region with a target head 15 through a read/write (or is performed a refresh process) through a read/write control unit 630, a life management unit 640 changes the recording mode and writes the particular data in the target recording region with the target head 15 (or executes a refresh process for the target recording region with the particular data with the target head 15) or writes the particular data in another recording region with another head 15 (or executes a refresh process for another recording region with the particular data with another head 15).

For example, in the case in which particular data is conventionally recorded on the target surface with the target head 15 through the read/write control unit 630, the life management unit 640 changes the recording mode of the target head 15 from conventional magnetic recording to shingled write magnetic recording, and shingled-records the particular data in the target recording region with the target head 15 or conventionally records the particular data on another surface with another head 15.

Figure 14:
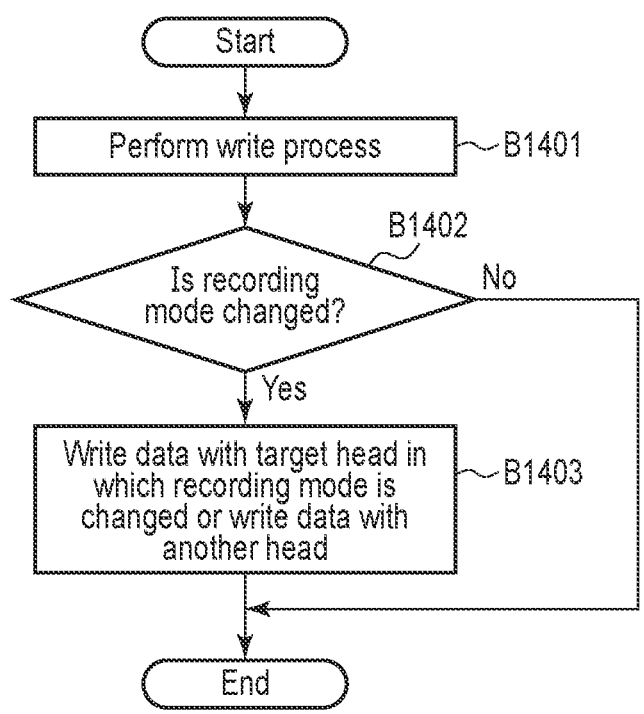
FIG. 14 is a schematic diagram illustrating an example of a write process method according to a third embodiment.

FIG. 14 is a schematic diagram illustrating an example of a write process method according to the third embodiment.

An MPU 60 performs the write process on the target surface with the target head 15 (B1401), and determines whether to change the recording mode of the target head 15 (B1402). For example, the MPU 60 performs the conventional magnetic recording process on the target surface with the target head 15, and determines whether to change the recording mode. For example, the MPU 60 performs the shingled write magnetic recording process on the target surface with the target head 15, and determines whether to change the recording mode of the target head 15.

In the case of determining that the recording mode of the target head 15 is not changed (NO in B1402), the MPU 60 ends the process. In the case of determining that the recording mode of the target head 15 is changed (YES in B1402), the MPU 60 performs writing with the target head 15 in which recording mode has been changed, or selects another head 15, and performs writing on another surface with the selected other head 15 (B1403). For example, in the case of determining that the recording mode is changed, the MPU 60 performs shingled write magnetic recording on the target surface with the target head 15 or performs conventional magnetic recording on another surface with another head 15.

According to the third embodiment, in the case in which the recording mode is changed while writing is performed on the target surface with the target head 15, the magnetic disk device 1 performs writing on the other surface with the other head 15. The magnetic disk device 1 can suppress the frequency of use of the target head 15. Therefore, the magnetic disk device 1 can extend the life of the target head 15. That is, the life of the magnetic disk device 1 can be extended. Accordingly, the magnetic disk device 1 enables the improvement of reliability.

Fifth Modification

A magnetic disk device 1 according to a fifth modification is different from the magnetic disk device 1 according to the third embodiment described above on the write process method.

In the case in which particular data is written in the target recording region with a target head 15 through a read/write control unit 630 according to the target evaluation index corresponding to a target assist element 200, a life management unit 640 changes the recording mode of the target head 15 and writes the particular data to the target recording region with the target head 15 or writes the particular data in another recording region with another head 15.

In the case in which particular data is conventionally recorded on the target surface with the target head 15 through the read/write control unit 630 according to the target evaluation index corresponding to the target assist element 200, the life management unit 640 changes the recording mode of the target head 15 from conventional magnetic recording to shingled write magnetic recording and shingled-records the particular data in the target recording region with the target head 15 or conventionally records the particular data on another surface with another head 15.

In the case of determining that (the change amount of) the target evaluation index corresponding to the target assist element 200 is larger than (or exceeds) the threshold of the target index (the change amount of the target evaluation index), the life management unit 640 changes, through the read/write control unit 630, the recording mode of the target head 15 and writes data to the target recording region with the target head 15 in the case in which data is written to the target recording region with the target head 15, or selects another head 15 mounted with another assist element 200 in which (the change amount of) another evaluation index is equal to or smaller than (the change amount of) the threshold of another index and writes data to another recording region with the selected other head 15. For example, in the case of determining that (the change amount of) the target evaluation index corresponding to the target assist element 200 is larger than (or exceeds) the threshold of (the change amount of) the target index, the life management unit 640 changes, through the read/write control unit 630, the recording mode of the target head 15 and writes data to the target recording region with the target head 15 in the case in which writing is performed in the target recording region with the target head 15, or selects another head 15 mounted with another assist element 200 having (the change amount of) another evaluation index smaller than (the change amount of) the target index. In other words, in the case of determining that (the change amount of) the target evaluation index is larger than (the change amount of) the other evaluation index and larger than (or exceeds) the threshold of (the change amount of) the target index, the life management unit 640 changes, through the read/write control unit 630, the recording mode of the target head 15 and writes data to the target recording region with the target head 15 in the case in which the target head 15 writes data to the target recording region, or selects another head 15 having (the change amount of) the other evaluation index smaller than (the change amount of) the target index. In the case of determining that (the change amount of) the target evaluation index corresponding to the target assist element 200 is the target index or less (the change amount of the target evaluation index) threshold, the life management unit 640 writes data to the target recording region with the target head 15 through the read/write control unit 630.

In the case of determining that (the change amount of) the target evaluation index corresponding to the target assist element 200 is larger than (or exceeds) the threshold of the target index (the change amount of the target evaluation index), the life management unit 640 changes, through the read/write control unit 630, the recording mode of the target head 15 from conventional magnetic recording to shingled write magnetic recording and writes the data to the target recording region with the target head 15 in the case in which conventional magnetic recording is performed in the target recording region with the target head 15, or selects another head 15 mounted with another assist element 200 in which (the change amount of) another evaluation index is equal to or less than the threshold of (the change amount of) another evaluation index, and performs conventional magnetic recording in another recording region with the selected other head 15. For example, in the case of determining that (the change amount of) the target evaluation index corresponding to the target assist element 200 is larger than (or exceeds) the threshold of (the change amount of) the target index, the life management unit 640 changes, through the read/write control unit 630, the recording mode of the target head 15 from conventional magnetic recording to shingled write magnetic recording and shingled write magnetic recording in the target recording region with the target head 15 in the case in which conventional magnetic recording is performed in the target recording region with the target head 15, or (the change amount of) another evaluation index is (the change amount of) the target evaluation index. In other words, in the case of determining that (the change amount of) the target evaluation index is larger than (the change amount of) the other evaluation index and is larger than (or exceeds) the threshold of (the change amount of) the target index, the life management unit 640 changes, through the read/write control unit 630, the recording mode of the target head 15 from conventional magnetic recording to shingled write magnetic recording and writes data to the target recording region with the target head 15 in the case in which the target head 15 conventionally records data in the target recording region, or selects another head 15 in which (the change amount of) the other evaluation index is smaller than (the change amount of) the target evaluation index. In the case of determining that (the change amount of) the target evaluation index corresponding to the target assist element 200 is the target index or less (the change amount of the target evaluation index) threshold, the life management unit 640 performs conventional magnetic recording in the target recording region with the target head 15 through the read/write control unit 630.

For example, in the case in which particular data is written in the target recording region with the target head 15 through the read/write control unit 630 according to the target BER corresponding to the target head 15 mounted with the target assist element 200, the life management unit 640 changes the recording mode of the target head 15 and writes the particular data in the target recording region with the target head 15 or writes the particular data in another recording region with another head 15.

In the case in which particular data is conventionally recorded on the target surface with the target head 15 through the read/write control unit 630 according to the target BER corresponding to the target head 15 mounted with the target assist element 200, the life management unit 640 changes the recording mode from conventional magnetic recording to shingled write magnetic recording and shingled-records the particular data in the target recording region with the target head 15 or conventionally records the particular data on the other surface with the other head 15.

For example, in the case of determining that the target BER corresponding to the target head 15 mounted with the target assist element 200 is larger than (or exceeds) the target BER threshold, the life management unit 640 changes, through the read/write control unit 630, the recording mode of the target head 15 and writes data to the target recording region with the target head 15 in the case in which the target head 15 writes data to the target recording region, or selects another head 15 mounted with another assist element 200 having another BER less than or equal to another BER threshold, and writes data in another recording region with the selected other head 15. For example, in the case of determining that (the change amount of) the target BER corresponding to the target assist element 200 is larger than (or exceeds) (the change amount of) the target BER threshold, the life management unit 640 changes, through the read/write control unit 630, the recording mode of the target head 15 and writes data to the target recording region with the target head 15 in the case in which the target head 15 writes data to the target recording region, or selects another head 15 mounted with another assist element 200 having another evaluation index smaller than the target index. In other words, in the case of determining that (the change amount of) the target BER is larger than (the change amount of) the other BER and is larger than (or exceeds) the threshold of (the change amount of) the target BER, the life management unit 640 changes, through the read/write control unit 630, the recording mode of the target head 15 and writes data to the target recording region with the target head 15 in the case in which the target head 15 writes data to the target recording region, or selects another head 15 in which the other BER is smaller than the target BER. In the case of determining that (the change amount of) the target BER is equal to or less than (the threshold of) the target BER, the life management unit 640 writes data to the target recording region with the target head 15 through the read/write control unit 630.

In the case of determining that (the change amount of) the target BER corresponding to the target head 15 mounted with the target assist element 200 is larger than (or exceeds) (the change amount of) the target BER threshold, the life management unit 640 changes, through the read/write control unit 630, the recording mode of the target head 15 from conventional magnetic recording to shingled write magnetic recording and performs shingled write magnetic recording in the target recording region with the target head 15 in the case in which conventional magnetic recording is performed in the target recording region with the target head 15, or selects another head 15 mounted with another assist element 200 having (the change amount of) another BER less than or equal to the threshold of (the change amount of) another BER and performs conventional magnetic recording in another recording region with the selected other head 15. For example, in the case of determining that the target BER corresponding to the target assist element 200 is larger than (or exceeds) the target BER threshold, the life management unit 640 changes, through the read/write control unit 630, the recording mode of the target head 15 from conventional magnetic recording to shingled write magnetic recording in the case in which conventional magnetic recording is performed in the target recording region with the target head 15, and performs shingled write magnetic recording in the target recording region with the target head 15, or selects another head 15 on which another assist element 200 in which (the change amount of) the other target BER is smaller than (the change amount of) the target BER is mounted. In other words, in the case of determining that (the change amount of) the target BER is larger than (the change amount of) the other BER and is larger than (or exceeds) the threshold of (the change amount of) the target BER, the life management unit 640 changes, through the read/write control unit 630, the recording mode of the target head 15 from conventional magnetic recording to shingled write magnetic recording and performs shingled write magnetic recording in the target recording region with the target head 15 in the case in which the target head 15 writes data to the target recording region, or selects another head 15 having (the change amount of) the other BER smaller than (the change amount of) the target BER. In the case of determining that (the change amount of) the target BER corresponding to the target assist element 200 is equal to or less than (the change amount of) the target BER threshold, the life management unit 640 conventionally records the target BER in the target recording region with the target head 15 through the read/write control unit 630.

For example, in the case in which particular data is written in the target recording region with the target head 15 through the read/write control unit 630 according to the resistance value of the target assist element corresponding to the target assist element 200, the life management unit 640 changes the recording mode of the target head 15 and writes the particular data in the target recording region with the target head 15 or writes the particular data in another recording region with another head 15.

In the case in which particular data is conventionally recorded on the target surface with the target head 15 through the read/write control unit 630 according to the resistance value of the target assist element corresponding to the target assist element 200, the life management unit 640 changes the recording mode from conventional magnetic recording to shingled write magnetic recording and shingled-records the particular data in the target recording region with the target head 15 or conventionally records the particular data in another recording region with another head 15.

For example, in the case of determining that (the change amount of) the resistance value of the target assist element corresponding to the target assist element 200 is larger than (or exceeds) the threshold of the target resistance (the change amount of the target resistance value), the life management unit 640 changes, through the read/write control unit 630, the recording mode of the target head 15 in the case in which writing is performed in the target recording region with the target head 15, and writes data to the target recording region with the target head 15, or selects another head 15 mounted with another assist element 200 in which (the change amount of) another assist element resistance value is equal to or less than (the change amount of) another target resistance threshold, and writs in another recording region with the selected other head 15. For example, in the case of determining that (the change amount of) the resistance value of the target assist element corresponding to the target assist element 200 is larger than (or exceeds) the threshold of the target resistance (the change amount of the target resistance value), the life management unit 640 changes, through the read/write control unit 630, the recording mode of the target head 15 and writes data to the target recording region with the target head 15 in the case in which the target head 15 writes data to the target recording region, or selects another head 15 mounted with another assist element 200 in which (the change amount of) the other assist element resistance value is smaller than (the change amount of) the resistance value of the target assist element. In other words, in the case of determining that (the change amount of) the resistance value of the target assist element is larger than (the change amount of) the other assist element resistance value and is larger than (or exceeds) the threshold of the target resistance (the change amount of the target resistance value), the life management unit 640 changes, through the read/write control unit 630, the recording mode of the target head 15 and writes data to the target recording region with the target head 15 in the case in which the target head 15 writes data to the target recording region, or selects another head 15 in which (the change amount of) the other assist element resistance value is smaller than (the change amount of) the resistance value of the target assist element. In the case of determining that (the change amount of) the resistance value of the target assist element is equal to or less than the threshold of the target resistance (the change amount of the target resistance value) value, the life management unit 640 writes data to the target recording region with the target head 15 through the read/write control unit 630.

In the case of determining that (the change amount of) the resistance value of the target assist element corresponding to the target assist element 200 is larger than the threshold of the target resistance (the change amount of the target resistance value) (or exceeds), the life management unit 640 changes, through the read/write control unit 630, the recording mode of the target 15 head 15 from conventional magnetic recording to shingled write magnetic recording and performs shingled write magnetic recording in the target recording region with the target head 15, or selects another head 15 mounted with another assist element 200 in which (the change amount of) the other assist element resistance value is equal to or less than the other resistance (the change amount of the target resistance value) threshold and performs conventional magnetic recording in the other recording region with the selected other head 15 in the case in which conventional magnetic recording is performed in the target recording region with the target head. For example, in the case of determining that (the change amount of) the resistance value of the target assist element corresponding to the target assist element 200 is larger than (or exceeds) the threshold of the target resistance (the change amount of the target resistance value), the life management unit 640 changes, through the read/write control unit 630, the recording mode of the target head 15 from conventional magnetic recording to shingled write magnetic recording in the case in which conventional magnetic recording is performed in the target recording region with the target head 15, and performs shingled write magnetic recording in the target recording region with the target head 15, or selects another head 15 mounted with another assist element 200 in which (the change amount of) the other assist element resistance value is smaller than (the change amount of) the other resistance threshold. In other words, in the case of determining that (the change amount of) the resistance value of the target assist element is larger than (the change amount of) the other assist element resistance value and is larger than (or exceeds) the threshold of the target resistance (the change amount of the target resistance value), the life management unit 640 changes, through the read/write control unit 630, the recording mode of the target head 15 from conventional magnetic recording to shingled write magnetic recording and performs shingled write magnetic recording in the target recording region with the target head 15 in the case in which the target head 15 writes data to the target recording region, or selects another head 15 in which (the change amount of) the other assist element resistance value is smaller than (the change amount of) the resistance value of the target assist element. In the case of determining that (the change amount of) the resistance value of the target assist element corresponding to the target assist element 200 is equal to or less than the threshold of the target resistance (the change amount of the target resistance value), the life management unit 640 conventionally records the resistance value of the target assist element in the target recording region with the target head 15 through the read/write control unit 630.

Figure 15:
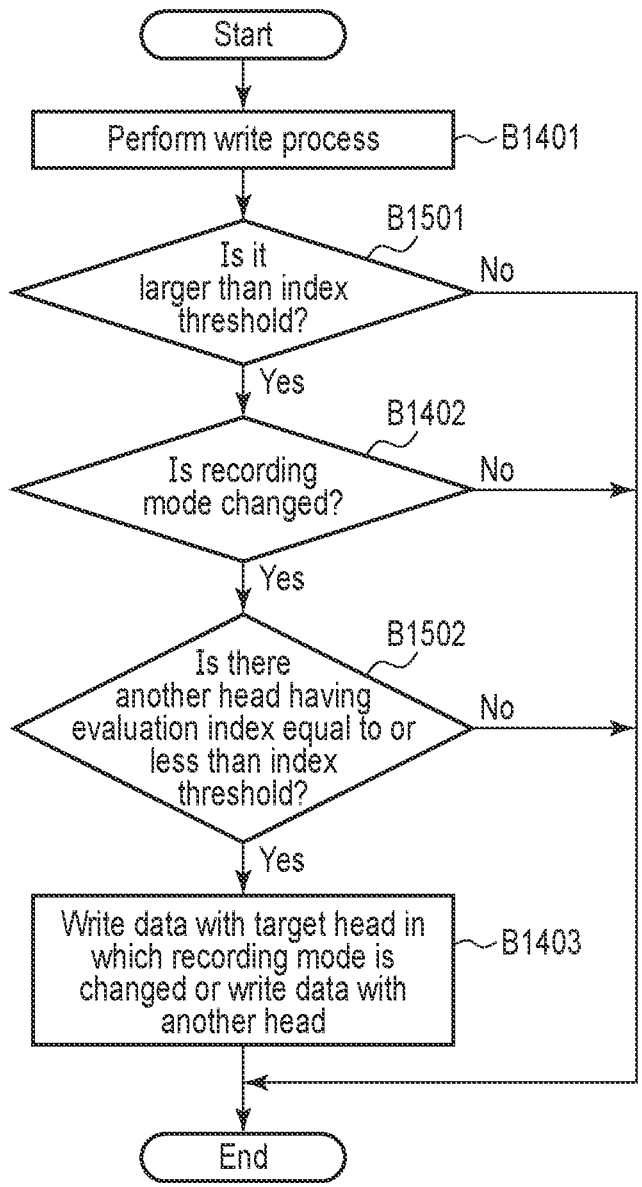
FIG. 15 is a schematic diagram illustrating an example of a write process method according to the fifth modification.

FIG. 15 is a schematic diagram illustrating an example of a write process method according to the fifth modification.

An MPU 60 performs the write process on the target surface with the target head 15 (B1401), and determines whether (the change amount of) the target evaluation index corresponding to the target assist element 200 is larger than the threshold of (the change amount of) the target index or whether the threshold of the target index (the change amount of the target evaluation index) is less than or equal to the threshold of the target index (the change amount of the target evaluation index) (B1501). In the case of determining that the target evaluation index is the target index threshold or less (NO in B1501), the MPU 60 ends the process. In the case of determining that (the change amount of) the target evaluation index is larger than the threshold of (the change amount of) the target index (YES in B1301), the MPU 60 determines whether to change the recording mode of the target head 15 (B1402).

In the case of determining that the recording mode of the target head 15 is not changed (NO in B1402), the MPU 60 ends the process. In the case of determining that the recording mode of the target head 15 is to be changed (YES in B1402), the MPU 60 determines whether there is another head 15 in which (change amount of) another evaluation index is equal to or less than the threshold of another index (change amount of another evaluation index) (B1502). In the case of determining that there is no other head 15 in which (change amount of) another evaluation index is equal to or less than the threshold of (the change amount of another evaluation index of) another index (NO of B1302), the MPU 60 ends the process. In the case of determining that there is another head 15 in which (the change amount of) another evaluation index is equal to or less than the threshold of (the change amount of another evaluation index of) another index (YES in B1302), the MPU 60 performs writing with the target head in which the recording mode is changed or selects another head 15 and performs writing on another surface with the selected other head 15 (B1403).

According to the fifth modification, in the case of determining that the target evaluation index corresponding to the target assist element 200 is larger than (or exceeds) the target index threshold, the magnetic disk device 1 changes the recording mode in the case in which writing is performed in the target recording region with the target head 15, and performs writing in the target recording region with the target head 15, or selects another head 15 mounted with another assist element 200 having another evaluation index equal to or smaller than another index threshold, and performs writing in another recording region with the selected other head 15. The magnetic disk device 1 can suppress the frequency of use of the target head 15. Therefore, the magnetic disk device 1 can extend the life of the target head 15. That is, the life of the magnetic disk device 1 can be extended. Accordingly, the magnetic disk device 1 enables the improvement of reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head including a read head that reads data from the disk, a write head that writes data to the disk, and an assist element that generates energy to enhance write performance by the write head; and
   a controller that selects and performs a first recording mode and a second recording mode different from the first recording mode, and selects and performs one of the first recording mode and the second recording mode according to an assist effect of the assist element, wherein
   the first recording mode is a conventional magnetic recording in which a track is written at an interval in a radial direction of the disk,
   the second recording mode is a shingled write magnetic recording in which a track is written in an overlapping manner in the radial direction,
   the controller selects and performs one of the first recording mode and the second recording mode according to an error rate corresponding to the head, and
   the controller performs the second recording mode when determining that the error rate is larger than a first threshold indicating a sign of deterioration of the assist element.

2. The magnetic disk device according to claim 1, wherein the controller decreases a first current to be supplied to the assist element and increases a second current to be supplied to the write head when determining that the error rate is larger than the first threshold.

3. The magnetic disk device according to claim 1, wherein the disk has a first surface including a first media cache and a first user data region, and a second surface different from the first surface, the second surface including a second media cache and a second user data region, and
   the head has a first head that writes data on the first surface and a second head that writes data on the second surface, and when determining that a first error rate corresponding to the first head is larger than the first threshold, the controller temporarily writes first data to the second media cache with the second head, and writes the first data read from the second media cache to the first user data region with the first head.

4. A magnetic disk device comprising:
   a disk;
   a head including a read head that reads data from the disk, a write head that writes data to the disk, and an assist element that generates energy to enhance write performance by the write head; and
   a controller that selects and performs a first recording mode and a second recording mode different from the first recording mode, and selects and performs one of the first recording mode and the second recording mode according to an assist effect of the assist element, wherein
   the first recording mode is a conventional magnetic recording in which a track is written at an interval in a radial direction of the disk,
   the second recording mode is a shingled write magnetic recording in which a track is written in an overlapping manner in the radial direction, and
   the controller selects and performs one of the first recording mode and the second recording mode according to a resistance value of the assist element.

5. The magnetic disk device according to claim 4, wherein the controller performs the second recording mode when determining that the resistance value is larger than a second threshold indicating a sign of deterioration of the assist element.

6. The magnetic disk device according to claim 5, wherein the controller decreases a first current to be supplied to the assist element and increases a second current to be supplied to the write head when determining that the resistance value is larger than the second threshold.

7. The magnetic disk device according to claim 5, wherein the disk has a first surface including a first media cache and a first user data region, and a second surface different from the first surface, the second surface including a second media cache and a second user data region,
   the head has a first head that writes data on the first surface and a second head that writes data on the second surface, and
   when determining that a first resistance value corresponding to the first head is larger than the second threshold, the controller temporarily writes first data to the second media cache with the second head, and writes the first data read from the second media cache to the first user data region with the first head.

8. A magnetic disk device comprising:
   a disk having a first surface including a first media cache and a first user data region and a second surface different from the first surface, the second surface including a second media cache and a second user data region;
   a first head having a first read head that reads data from the first surface, a first write head that writes data to the first surface, and a first assist element that generates energy to enhance write performance with the first write head;

a second head having a second read head that reads data from the second surface, a second write head that writes data to the second surface, and a second assist element that generates energy to enhance write performance with the second write head; and a controller that temporarily writes first data to the second surface with the second head when the first head writes the first data to the first surface.

9. The magnetic disk device according to claim 8, wherein a change amount of a first resistance value of the first assist element is larger than a change amount of a second resistance value of the second assist element.

10. The magnetic disk device according to claim 8, wherein a change amount of a first bit error rate (BER) corresponding to the first head is larger than a change amount of a second BER corresponding to the second head.

11. The magnetic disk device according to claim 8, wherein the controller performs a refresh process on a first track including the first data when an access frequency to the first data is equal to or less than a first threshold.

12. The magnetic disk device according to claim 8, wherein when first data is written in the first user data region with the first head, the controller temporarily writes the first data in the second media cache with the second head.

13. The magnetic disk device according to claim 8, wherein when first data is written in the first user data region with the first head, the controller temporarily writes the first data in the second user data region with the second head.

14. A magnetic disk device comprising:
a disk having a first surface including a first media cache and a first user data region and a second surface different from the first surface, the second surface including a second media cache and a second user data region;
a first head having a first read head that reads data from the first surface, a first write head that writes data to the first surface, and a first assist element that generates energy to enhance write performance by the first write head;
a second head having a second read head that reads data from the second surface, a second write head that writes data to the second surface, and a second assist element that generates energy to enhance write performance with the second write head; and
a controller that refreshingly writes data written on the first surface with the first head by a shingled recording mode, to the second surface with the second head by a conventional recording mode, or refreshingly writes data written on the second surface with the second head by a conventional recording mode, to the first surface with the first head by a shingled recording mode.

15. The magnetic disk device according to claim 14, wherein a change amount of a first resistance value of the first assist element is larger than a change amount of a second resistance value of the second assist element.

16. The magnetic disk device according to claim 14, wherein a change amount of a first BER corresponding to the first head is larger than a change amount of a second BER corresponding to the second head.

* * * * *